United States Patent
Maeda et al.

(10) Patent No.: US 7,180,263 B2
(45) Date of Patent: Feb. 20, 2007

(54) SYNCHRONOUS MOTOR CONTROL METHOD AND DEVICE

(75) Inventors: Toshiyuki Maeda, Nara (JP); Manabu Kosaka, Nara (JP); Masanobu Kita, Nara (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/416,271

(22) PCT Filed: Nov. 9, 2001

(86) PCT No.: PCT/JP01/09855

§ 371 (c)(1),
(2), (4) Date: Oct. 31, 2003

(87) PCT Pub. No.: WO02/39576

PCT Pub. Date: May 16, 2002

(65) Prior Publication Data

US 2004/0056629 A1    Mar. 25, 2004

(30) Foreign Application Priority Data

Nov. 9, 2000    (JP) ............................ 2000-341638

(51) Int. Cl.
*H02P 6/00* (2006.01)
*H02K 7/00* (2006.01)

(52) U.S. Cl. ............... 318/719; 318/701; 318/721; 318/727; 318/802; 318/807

(58) Field of Classification Search ........ 318/700–727, 318/799, 434, 254, 802, 807
See application file for complete search history.

(56) References Cited

U.S. PATENT DOCUMENTS

| 5,144,564 | A | * | 9/1992 | Naidu et al. ............... 318/721 |
| 5,272,429 | A | * | 12/1993 | Lipo et al. ............... 318/808 |
| 5,410,234 | A | * | 4/1995 | Shibata et al. ............. 318/700 |
| 5,504,404 | A | * | 4/1996 | Tamaki et al. ............ 318/432 |
| 5,585,708 | A | * | 12/1996 | Richardson et al. ...... 318/800 |
| 5,585,709 | A | * | 12/1996 | Jansen et al. .............. 318/807 |

(Continued)

FOREIGN PATENT DOCUMENTS

JP    8-191587 A    7/1996

(Continued)

*Primary Examiner*—Paul Ip
(74) *Attorney, Agent, or Firm*—Birch, Stewart, Kolasch & Birch, LLP

(57) ABSTRACT

Synchronous motor controlling apparatus and method controls power applied to minimize or eliminate speed variations of a synchronous motor due to variations in load imposed the motor. The rotational position of a rotor of the synchronous motor based on the input terminal voltages and currents to the synchronous motor, and the power applied to the motor is adjusted accordingly. Higher harmonics of the input voltages and currents may also be used to detect the position of the rotor. In addition, the apparatus and method also accounts for the varying speed command inputs.

36 Claims, 26 Drawing Sheets

U.S. PATENT DOCUMENTS

| | | | |
|---|---|---|---|
| 5,857,349 A * | 1/1999 | Hamaoka et al. | 62/228.4 |
| 5,977,740 A * | 11/1999 | McCann | 318/701 |
| 6,005,364 A * | 12/1999 | Acarnley | 318/632 |
| 6,014,004 A * | 1/2000 | Hamaoka et al. | 318/778 |
| 6,069,467 A * | 5/2000 | Jansen | 318/802 |
| 6,137,258 A * | 10/2000 | Jansen | 318/802 |
| 6,208,109 B1 * | 3/2001 | Yamai et al. | 318/716 |
| 6,244,061 B1 * | 6/2001 | Takagi et al. | 62/229 |
| 6,344,725 B2 * | 2/2002 | Kaitani et al. | 318/700 |
| 6,377,018 B2 * | 4/2002 | Tajima et al. | 318/727 |
| 6,414,462 B2 * | 7/2002 | Chong | 318/701 |
| 6,462,492 B1 * | 10/2002 | Sakamoto et al. | 318/254 |
| 6,541,939 B2 * | 4/2003 | Kishibe et al. | 318/799 |
| 6,650,083 B2 * | 11/2003 | Jung | 318/701 |
| 6,724,168 B2 * | 4/2004 | Cheong et al. | 318/701 |
| 6,727,675 B2 * | 4/2004 | Yoshimoto et al. | 318/700 |
| 6,784,634 B2 * | 8/2004 | Sweo | 318/727 |
| 2001/0043048 A1 * | 11/2001 | Tajima et al. | 318/727 |
| 2001/0048283 A1 * | 12/2001 | Kaitani et al. | 318/700 |
| 2003/0052640 A1 * | 3/2003 | Iwaji et al. | 318/700 |
| 2003/0052641 A1 * | 3/2003 | Yoshimoto et al. | 318/700 |
| 2003/0128009 A1 * | 7/2003 | Sakurai et al. | 318/722 |
| 2003/0146723 A1 * | 8/2003 | Pavlov et al. | 318/432 |
| 2004/0051495 A1 * | 3/2004 | Kaneko et al. | 318/807 |
| 2004/0061461 A1 * | 4/2004 | Tajima et al. | 318/254 |
| 2004/0178764 A1 * | 9/2004 | Kaku et al. | 318/716 |
| 2004/0201358 A1 * | 10/2004 | Kawaji et al. | 318/701 |
| 2004/0249596 A1 * | 12/2004 | Ho | 702/106 |
| 2005/0081647 A1 * | 4/2005 | Yin Ho | 73/862.193 |

FOREIGN PATENT DOCUMENTS

| | | |
|---|---|---|
| JP | 10-243684 A | 9/1998 |
| JP | 11-275884 A | 10/1999 |
| JP | 2001-037281 A | 2/2001 |

* cited by examiner

Torque pattern of compressor for air-conditioning

SYNCHRONOUS MOTOR CONTROL METHOD AND DEVICE

This application is the national phase under 35 U.S.C. § 371 of PCT International Application No. PCT/JP01/09855 which has an International filing date of Nov. 9, 2001, which designated the United States of America.

TECHNICAL FIELD

The present invention relates to a method and apparatus for controlling a synchronous motor. More particularly, the present invention relates to a novel method and apparatus for controlling a synchronous motor which detect a rotational position of a rotor using a motor model, and control the synchronous motor accurately even when load, speed command value and torque command vary.

RELATED ART

From the past, a synchronous motor is employed as a driving source of each of various species of devices. Improvement in voltage utilization rate {enlargement in driving range (due to over modulation}, realizing high efficiency, improvement in controllability, realizing low noise} is: required for such synchronous motor. Also, improvement in reliability, decrease in cost due to sensors being unnecessary for detecting a rotational position of a rotor, and realizing in accuracy are required.

To satisfy such requirements, the following methods for controlling synchronous motor are proposed:

(1) A sensorless vector controlling is proposed using a disturbance observer which takes induced voltage as disturbance, as is illustrated in "Sensorless Controlling of IPM Motor", Motor Technology symposium B-5, 1999/3. This sensor-less vector controlling is a controlling method using a disturbance observer and current controlling without over modulation.

(2) A method is also proposed which observes an induced voltage of a non-conduction phase of a motor by determining a conduction period to be 120 degrees, the period being a period for conducting a stator winding of a synchronous motor, detects a rotational position of a rotor from the motor induced voltage, and controls the synchronous, motor by carrying out voltage phase controlling.

When the method (1) is employed, a voltage utilization rate cannot be improved because current controlling is employed. Thus, lowering in induced voltage by decreasing the motor winding is required. Therefore, efficiency is lowered. Further, the position is shifted depending upon the driving condition of the motor. Therefore, sufficient suppression effect in vibration cannot be obtained even when the torque controlling is carried out for suppressing speed variation within one rotation.

When the method (2) is employed, the conduction width cannot be enlarged and the voltage utilization rate cannot be raised because the induced voltage of the non-conduction phase is observed. Also, controllable range in voltage phase is small so that IPM (brush-less DC motor having a rotor which has magnet embedded arrangement) cannot be driven with efficiency. Further, it is difficult for the controlling to be made accurate because only rotational position detection at every 60 degrees can be carried out.

The present invention was made in view of the above problems.

It is an object of the present invention to offer a method and apparatus for controlling synchronous motor which realizes improvement in controllability, improvement in voltage utilization rate, decrease in noise, sufficient suppression in vibration, and improvement in efficiency, with little affection of the motor characteristics.

SUMMARY OF THE INVENTION

An embodiment of a method for controlling synchronous motor detects a rotational position of a rotor using input terminal voltages, currents of a synchronous motor driving a load having periodic torque variation and instrumental constants of the synchronous motor, which controls output currents or output voltages of an inverter based upon the rotational position detection result so that speed variation of the synchronous motor due to the periodic torque variation is denied, and which supplies the output voltages or output currents of the inverter to the synchronous motor.

An embodiment of a method for controlling synchronous motor detects a rotational position of a rotor using higher harmonics of input terminal voltages, higher harmonics of currents of a synchronous motor driving a load having periodic torque variation and inductance distribution of the synchronous motor, which controls output currents or output voltages of an inverter based upon the rotational position detection result so that speed variation of the synchronous motor due to the periodic torque variation is denied, and which supplies the output voltages or output currents of the inverter to the synchronous motor.

An embodiment of a method for controlling synchronous motor controls the synchronous motor within a range of current phase which satisfies the equation of $(L_d-L_q)i_d+\phi>0$ ($L_d$ represents d-axis inductance, $L_q$ represents q-axis inductance, $i_d$ represents d-axis current, $\phi$ represents rotor flux linkage).

An embodiment of a method for controlling synchronous motor detects the rotational position using rotating coordinate motor model.

An embodiment of a method for controlling synchronous motor controls a motor which is small in $|L_d-L_q|$.

An embodiment of a method for controlling synchronous motor detects the rotational position using fixed coordinate motor model.

An embodiment of a method for controlling synchronous motor controls a motor which is great in $|L_d-L_q|$.

An embodiment of a method for controlling synchronous motor carries out the torque controlling by determining a feedback gain for frequency component of rotational speed variation to be infinite.

An embodiment of a method for controlling synchronous motor previously stores current or voltage pattern according to load variation, and which outputs corresponding current or voltage pattern according to the rotational position detection result so that speed variation due to the load variation is reduced.

An embodiment of a method for controlling synchronous motor carries out the torque controlling by adjusting of the current phase and the current amplitude.

An embodiment of a method for controlling synchronous motor carries out the torque controlling by maintaining the current phase to be constant and by varying the current amplitude.

An embodiment of a method for controlling synchronous motor drives a compressor for an air conditioner using the synchronous motor.

An embodiment of a method for controlling synchronous motor controls a synchronous motor under a condition where speed command value, torque command or load changes from moment to moment, detects a rotational position of a rotor using input terminal voltages, currents of a synchronous motor driving a load having periodic torque variation and instrumental constants of the synchronous motor, which obtains a rotational position correction result using a filter based upon the rotational position detection result, cancels delay of the filter receiving the rotational position detection result as the input or delay due to response speed of the rotational position detection, controls output currents or output voltages of an inverter based upon the rotational position correction result or the value canceled the delay, and supplies the output voltages or output currents of the inverter to the synchronous motor.

An embodiment of a method for controlling synchronous motor controls a synchronous motor under a condition where speed command value, torque command or load changes from moment to moment, calculates a rotational position of a rotor using input terminal voltages, currents of a synchronous motor and instrumental constants of the synchronous motor, controls output currents or output voltages of an inverter based upon the rotational position calculation result, and supplies the output voltages or output currents of the inverter to the synchronous motor.

An embodiment of a method for controlling synchronous motor employs fixed coordinate motor model, calculates flux by integrating the motor voltage, and calculates the rotational position from the rotational position information of the rotor included within the flux.

An embodiment of a method for controlling synchronous motor employs a motor having magnetic salient pole as the synchronous motor, and calculates a rotational position using higher harmonics of input voltage and higher harmonics of current.

An embodiment of a method for controlling synchronous motor drives a compressor for an air conditioner using the synchronous motor.

An embodiment of an apparatus for controlling synchronous motor comprises rotational position detection means for detecting a rotational position of a rotor using input terminal voltages, currents of a synchronous motor driving a load having periodic torque variation and instrumental constants of the synchronous motor, and inverter controlling means for controlling output currents or output voltages of an inverter based upon the rotational position detection result so that speed variation of the synchronous motor due to the periodic torque variation is denied.

An embodiment of an apparatus for controlling synchronous motor includes rotational position detection means for detecting a rotational position of a rotor using higher harmonics of input terminal voltages, higher harmonics of currents of a synchronous motor driving a load having periodic torque variation and inductance distribution of the synchronous motor, and inverter controlling means for controlling output currents or output voltages of an inverter based upon the rotational position detection result so that speed variation of the synchronous motor due to the periodic torque variation is denied.

An embodiment of an apparatus for controlling synchronous motor includes means for controlling the synchronous motor within a range of current phase which satisfies the equation of $(L_d-L_q)i_d+\phi>0$ ($L_d$ represents d-axis inductance, $L_q$ represents q-axis inductance, $i_d$ represents d-axis current, $\phi$ represents rotor flux linkage) as the inverter controlling means.

An embodiment of an apparatus for controlling synchronous motor includes means for detecting the rotational position using rotating coordinate motor model as the rotational position detection means.

An embodiment of an apparatus for controlling synchronous motor includes a motor which is small in $|L_d-L_q|$ as the synchronous motor.

An embodiment of an apparatus for controlling synchronous motor includes means for detecting the rotational position using fixed coordinate motor model as the rotational position detection means.

An embodiment of an apparatus for controlling synchronous motor includes a motor which is great in $|L_d-L_q|$ as the synchronous motor.

An embodiment of an apparatus for controlling synchronous motor includes means for carrying out the torque controlling by determining a feedback gain for frequency component of rotational speed variation to be infinite as the inverter controlling means.

An embodiment of an apparatus for controlling synchronous motor includes means for previously storing current or voltage pattern according to load variation, and for outputting corresponding current or voltage pattern according to the rotational position detection result so that speed variation due to the load variation is reduced, as the inverter controlling means.

An embodiment of an apparatus for controlling synchronous motor is an apparatus which employs means for carrying out the torque controlling by making relevancy of the current phase and the current amplitude as the inverter controlling means.

An embodiment of an apparatus for controlling synchronous motor includes means for carrying out the torque controlling by maintaining the current phase to be constant and by varying the current amplitude as the inverter controlling means.

An embodiment of an apparatus for controlling synchronous motor includes a motor for driving a compressor for an air conditioner as the synchronous motor.

An embodiment of an apparatus for controlling synchronous motor includes a synchronous motor under a condition where speed command value, torque command or load changes from moment to moment, rotational position detection means for detecting a rotational position of a rotor using input terminal voltages, currents of a synchronous motor driving a load having periodic torque variation and instrumental constants of the synchronous motor, filter means for obtaining a rotational position correction result based upon the rotational position detection result, canceling means for canceling delay of the filter receiving the rotational position detection result as the input or delay due to response speed of the rotational position detection, and inverter controlling means for controlling output currents or output voltages of an inverter based upon the rotational position correction result or the value canceled the delay.

An embodiment of an apparatus for controlling synchronous motor under a condition where speed command value, torque command or load changes from moment to moment includes rotational position calculation means for calculating a rotational position of a rotor using input terminal voltages, currents of a synchronous motor and instrumental constants of the synchronous motor, and inverter controlling means for controlling output currents or output voltages of an inverter based upon the rotational position calculation result.

An embodiment of an apparatus for controlling synchronous motor includes means for using fixed coordinate motor model, for calculating flux by integrating the motor voltage, and for calculating the rotational position from the rotational position information of the rotor included within the flux, as the rotational position calculation means.

An embodiment of an apparatus for controlling synchronous motor includes a motor having magnetic salient pole as the synchronous motor, and which employs means for calculating a rotational position using higher harmonics of input voltage and higher harmonics of current as the rotational position calculation means.

An embodiment of an apparatus for controlling synchronous motor includes a motor for driving a compressor for an air conditioner as the synchronous motor.

When the method for controlling synchronous motor of an embodiment of the present invention is employed, the method detects a rotational position of a rotor using input terminal voltages, currents of a synchronous motor driving a load having periodic torque variation and instrumental constants of the synchronous motor, controls output currents or output voltages of an inverter based upon the rotational position detection result so that speed variation of the synchronous motor due to the periodic torque variation is denied, and supplies the output voltages or output currents of the inverter to the synchronous motor. Therefore, the speed variation of the synchronous motor is prevented from occurring or is suppressed greatly even when the load has periodic torque variation. As a result, the method realizes improvement in controllability, improvement in voltage utilization rate, decrease in noise, sufficient suppression in vibration, and improvement in efficiency, with little effect on of the motor characteristics.

When the method for controlling synchronous motor of an embodiment is employed, the method detects a rotational position of a rotor using higher harmonics of input terminal voltages, higher harmonics of currents of a synchronous motor driving a load having periodic torque variation and inductance distribution of the synchronous motor, controls output currents or output voltages of an inverter based upon the rotational position detection result so that speed variation of the synchronous motor due to the periodic torque variation is denied, and supplies the output voltages or output currents of the inverter to the synchronous motor. Therefore, the speed variation of the synchronous motor is prevented from occurrence or is suppressed greatly by reducing the error even when the load has periodic torque variation. As a result, the method realizes improvement in controllability, improvement in voltage utilization rate, decrease in noise, sufficient suppression in vibration, and improvement in efficiency, with little effect on of the motor characteristics.

When the method for controlling synchronous motor of an embodiment is employed, the method controls the synchronous motor within a range of current phase which satisfies the equation of $(L_d-L_q)i_d+\phi>0$ ($L_d$ represents d-axis inductance, $L_q$ represents q-axis inductance, $i_d$ represents d-axis current, $\phi$ represents rotor flux linkage). Therefore, the rotational position of the rotor can be detected securely.

When the method for controlling synchronous motor of an embodiment is employed, the method detects the rotational position using rotating coordinate motor model.

When the method for controlling synchronous motor of an embodiment is employed, the method controls a motor which is small in $|L_d-L_q|$.

When the method for controlling synchronous motor of an embodiment is employed, the method detects the rotational position using fixed coordinate motor model.

When the method for controlling synchronous motor of an embodiment is employed, the method controls a motor which is great in $|L_d-L_q|$. Therefore, the operation and effect similar to those listed immediately above are realized by applying the method to a motor having a great salient pole ratio. The method may not be applicable to the motor when the method employs rotating coordinate motor model.

When the method for controlling synchronous motor of an embodiment is employed, the method carries out the torque controlling by determining a feedback gain for frequency component of rotational speed variation to be infinite. Therefore, rotation speed variation can be suppressed securely.

When the method for controlling synchronous motor of of an embodiment is employed, the method previously stores current or voltage pattern according to load variation, and outputs corresponding current or voltage pattern according to the rotational position detection result so that speed variation due to the load variation is reduced.

When the method for controlling synchronous motor of an embodiment is employed, the method carries out the torque controlling by making relevancy of the current phase and the current amplitude. Therefore, improvement in efficiency is realized.

When the method for controlling synchronous motor of an embodiment is employed, the method carries out the torque controlling by maintaining the current phase to be constant and by varying the current amplitude. Therefore, the control can be simplified.

When the method for controlling synchronous motor of an embodiment is employed, the method drives a compressor for an air conditioner using the synchronous motor. Therefore, the compressor for an air conditioner can be driven in a stable condition which has great load variation and is needed to be operated at high speed.

When the method for controlling synchronous motor of an embodiment is employed, the method controls a synchronous motor under a condition where speed command value, torque command or load changes from moment to moment, detects a rotational position of a rotor using input terminal voltages, currents of a synchronous motor driving a load having periodic torque variation and instrumental constants of the synchronous motor, obtains a rotational position correction result using a filter based upon the rotational position detection result, cancels delay of the filter receiving the rotational position detection result as the input or delay due to response speed of the rotational position detection, controls output currents or output voltages of an inverter based upon the rotational position correction result or the value canceled the delay, and supplies the output voltages or output currents of the inverter to the synchronous motor. Therefore, the method can deal with either small delay case or great delay case so that the speed variation of the synchronous motor can be prevented from occurrence or can be greatly suppressed. As a result, the method realizes improvement in controllability, improvement in voltage utilization rate, decrease in noise, sufficient suppression in vibration, and improvement in efficiency, with little effect on of the motor characteristics.

When the method for controlling synchronous motor of an embodiment is employed, the method controls a synchronous motor under a condition where speed command value, torque command or load changes from moment to moment, calculates a rotational position of a rotor using input terminal voltages, currents of a synchronous motor and instrumental constants of the synchronous motor, controls output currents or output voltages of an inverter based upon the rotational position calculation result, and supplies the output voltages or output currents of the inverter to the synchronous motor. Therefore, the method can sufficiently follow the high speed variation, and can prevent or greatly suppress the speed variation of the synchronous motor. As a result, the method realizes improvement in controllability, improvement in voltage utilization rate, decrease in noise, sufficient suppression in vibration, and improvement in efficiency, with little effect on the motor characteristics.

When the method for controlling synchronous motor of an embodiment is employed, the method employs fixed coordinate motor model, the method calculates flux by integrating the motor voltage, and calculates the rotational position from the rotational position information of the rotor included within the flux. Therefore, the method can sufficiently follow the high speed variation, and can prevent or greatly suppress the speed variation of the synchronous motor. As a result, the method realizes improvement in controllability, improvement in voltage utilization rate, decrease in noise, sufficient suppression in vibration, and improvement in efficiency, with little effect on the motor characteristics.

When the method for controlling synchronous motor of an embodiment is employed, the method employs a motor having magnetic salient pole as the synchronous motor, and the method calculates a rotational position using higher harmonics of input voltage and higher harmonics of current. Therefore, the method can carries out the rotational position detection without error for rapid load variation.

When the method for controlling synchronous motor of an embodiment is employed, the method drives a compressor for an air conditioner using the synchronous motor. Therefore, the compressor for an air conditioner can be driven in a stable condition which has great load variation and is needed to be operated at high speed.

When the apparatus for controlling synchronous motor of an embodiment is employed, the apparatus detects a rotational position of a rotor using input terminal voltages, currents of a synchronous motor driving a load having periodic torque variation and instrumental constants of the synchronous motor by the rotational position detection means, and controls output currents or output voltages of an inverter based upon the rotational position detection result so that speed variation of the synchronous motor due to the periodic torque variation is denied, by the inverter controlling means.

Therefore, the speed variation of the synchronous motor is prevented from occurrence or is suppressed greatly even when the load has periodic torque variation. As a result, the method realizes improvement in controllability, improvement in voltage utilization rate, decrease in noise, sufficient suppression in vibration, and improvement in efficiency, with little effect on the motor characteristics.

When the apparatus for controlling synchronous motor of an embodiment is employed, the apparatus detects a rotational position of a rotor using higher harmonics of input terminal voltages, higher harmonics of currents of a synchronous motor driving a load having periodic torque variation and inductance distribution of the synchronous motor by the rotational position detection means, and controls output currents or output voltages of an inverter based upon the rotational position detection result so that speed variation of the synchronous motor due to the periodic torque variation is denied, by the inverter controlling means.

Therefore, the speed variation of the synchronous motor is prevented from occurrence or is suppressed greatly by reducing the error even when the load has periodic torque variation. As a result, the method realizes improvement in controllability, improvement in voltage utilization rate, decrease in noise, sufficient suppression in vibration, and improvement in efficiency, with little effect on the motor characteristics.

When the apparatus for controlling synchronous motor of an embodiment is employed, the apparatus employs means for controlling the synchronous motor within a range of current phase which satisfies the equation of $(L_d-L_q)i_d+\phi>0$ ($L_d$ represents d-axis inductance, $L_q$ represents q-axis inductance, $i_d$ represents d-axis current, $\phi$ represents rotor flux linkage) as the inverter controlling means. Therefore, the rotational position of the rotor can be detected securely.

When the apparatus for controlling synchronous motor of an embodiment is employed, the apparatus employs means for detecting the rotational position using rotating coordinate motor model as the rotational position detection means.

When the apparatus for controlling synchronous motor of an embodiment is employed, the apparatus employs a motor which is small in $|L_d-L_q|$ as the synchronous motor. Therefore, the rotational position detection error is prevented from generation.

When the apparatus for controlling synchronous motor of an embodiment is Employed, the apparatus employs means for detecting the rotational position using fixed coordinate motor model as the rotational position detection means.

When the apparatus for controlling synchronous motor of an embodiment is Employed, the apparatus employs a motor which is great in $|L_d-L_q|$ as the synchronous motor. Therefore, the operation and effect similar to the embodiment listed immediately above are realized by applying the method to a motor having a great salient pole ratio. The method may not be applicable to the motor when the method employs rotating coordinate motor model.

When the apparatus for controlling synchronous motor of an embodiment is employed, the apparatus employs means for carrying out the torque controlling by determining a feedback gain for frequency component of rotational speed variation to be infinite as the inverter controlling means. Therefore, rotation speed variation can be suppressed securely.

When the apparatus for controlling synchronous motor of an embodiment is employed, the apparatus employs means for previously storing current or voltage pattern according to load variation, and for outputting corresponding current or voltage pattern according to the rotational position detection result so that speed variation due to the load variation is reduced, as the inverter controlling means.

When the apparatus for controlling synchronous motor of an embodiment is employed, the apparatus employs means for carrying out the torque controlling by making relevancy of the current phase and the current amplitude as the inverter controlling means. Therefore, improvement in efficiency is realized.

When the apparatus for controlling synchronous motor of an embodiment is employed, the apparatus employs means for carrying out the torque controlling by maintaining the current phase to be constant and by varying the current amplitude as the inverter controlling means. Therefore, the control can be simplified.

When the apparatus for controlling synchronous motor of an embodiment is employed, the apparatus employs a motor for driving a compressor for an air conditioner as the synchronous motor. Therefore, the compressor for an air conditioner can be driven in a stable condition which has great load variation and is needed to be operated at high speed.

When the apparatus for controlling synchronous motor of an embodiment is employed, the apparatus controls a synchronous motor under a condition where speed command value, torque command or load changes from moment to moment, and the apparatus detects a rotational position of a rotor using input terminal voltages, currents of a synchronous motor driving a load having periodic torque variation and instrumental constants of the synchronous motor by the rotational position detection means, obtains a rotational position correction result based upon the rotational position detection result by the filter means, cancels delay of the filter receiving the rotational position detection result as the input or delay due to response speed of the rotational position detection by the canceling means, and controls output currents or output voltages of an inverter based upon the rotational position correction result or the value canceled the delay by the inverter controlling means.

Therefore, the apparatus can deal with either small delay case or great delay case so that the speed variation of the synchronous motor can be prevented from occurrence or can be greatly suppressed. As a result, the apparatus realizes improvement in controllability, improvement in voltage utilization rate, decrease in noise, sufficient suppression in vibration, and improvement in efficiency, with little effect on the motor characteristics.

When the apparatus for controlling synchronous motor of an embodiment is employed, the apparatus controls a synchronous motor under a condition where speed command value, torque command or load changes from moment to moment, and the apparatus calculates a rotational position of a rotor using input terminal voltages, currents of a synchronous motor and instrumental constants of the synchronous motor by the rotational position calculation means, and controls output currents or output voltages of an inverter based upon the rotational position calculation result by the inverter controlling means.

Therefore, the apparatus can sufficiently follow the high speed variation, and can prevent or greatly suppress the speed variation of the synchronous motor. As a result, the apparatus realizes improvement in controllability, improvement in voltage utilization rate, decrease in noise, sufficient suppression in vibration, and improvement in efficiency, with little effect on the motor characteristics.

When the apparatus for controlling synchronous motor of an embodiment is employed, the apparatus employs means for using fixed coordinate motor model, for calculating flux by integrating the motor voltage, and for calculating the rotational position from the rotational position information of the rotor included within the flux, as the rotational position calculation means. Therefore, the apparatus can sufficiently follow the high speed variation, and can prevent or greatly suppress the speed variation of the synchronous motor. As a result, the apparatus realizes improvement in controllability, improvement in voltage utilization rate, decrease in noise, sufficient suppression in vibration, and improvement in efficiency, with little effect on the motor characteristics.

When the apparatus for controlling synchronous motor of an embodiment is employed, the apparatus employs a motor having magnetic salient pole as the synchronous motor, and which employs means for calculating a rotational position using higher harmonics of input voltage and higher harmonics of current as the rotational position calculation means. Therefore, the apparatus can carries out the rotational position detection without error for rapid load variation.

When the apparatus for controlling synchronous motor of an embodiment is employed, the apparatus employs a motor for driving a compressor for an air conditioner as the synchronous motor. Therefore, the compressor for an air conditioner can be driven in a stable condition which has great load variation and is needed to be operated at high speed.

BRIEF DESCRIPTION OF THE DRAWINGS

FIG. 22 is a diagram illustrating simulation result of change in passage of time of current phase estimation value within the controller obtained by the synchronous motor controlling apparatus of FIG. 17;

FIG. 23 is a diagram illustrating simulation result of change in passage of time of load torque obtained by the synchronous motor controlling apparatus which has no canceling means;

FIG. 26 is a diagram illustrating simulation result of change in passage of time of current phase obtained by the synchronous motor controlling apparatus which has no canceling means;

DETAILED DESCRIPTION

Hereinafter, referring to the attached drawings, we explain embodiments of a synchronous motor controlling method and apparatus thereof according to embodiments of the present invention in detail. In each of the following embodiments, cases are explained in which output voltages of an inverter are controlled. But, it is possible that output currents of an inverter can be controlled.

Figure 1:
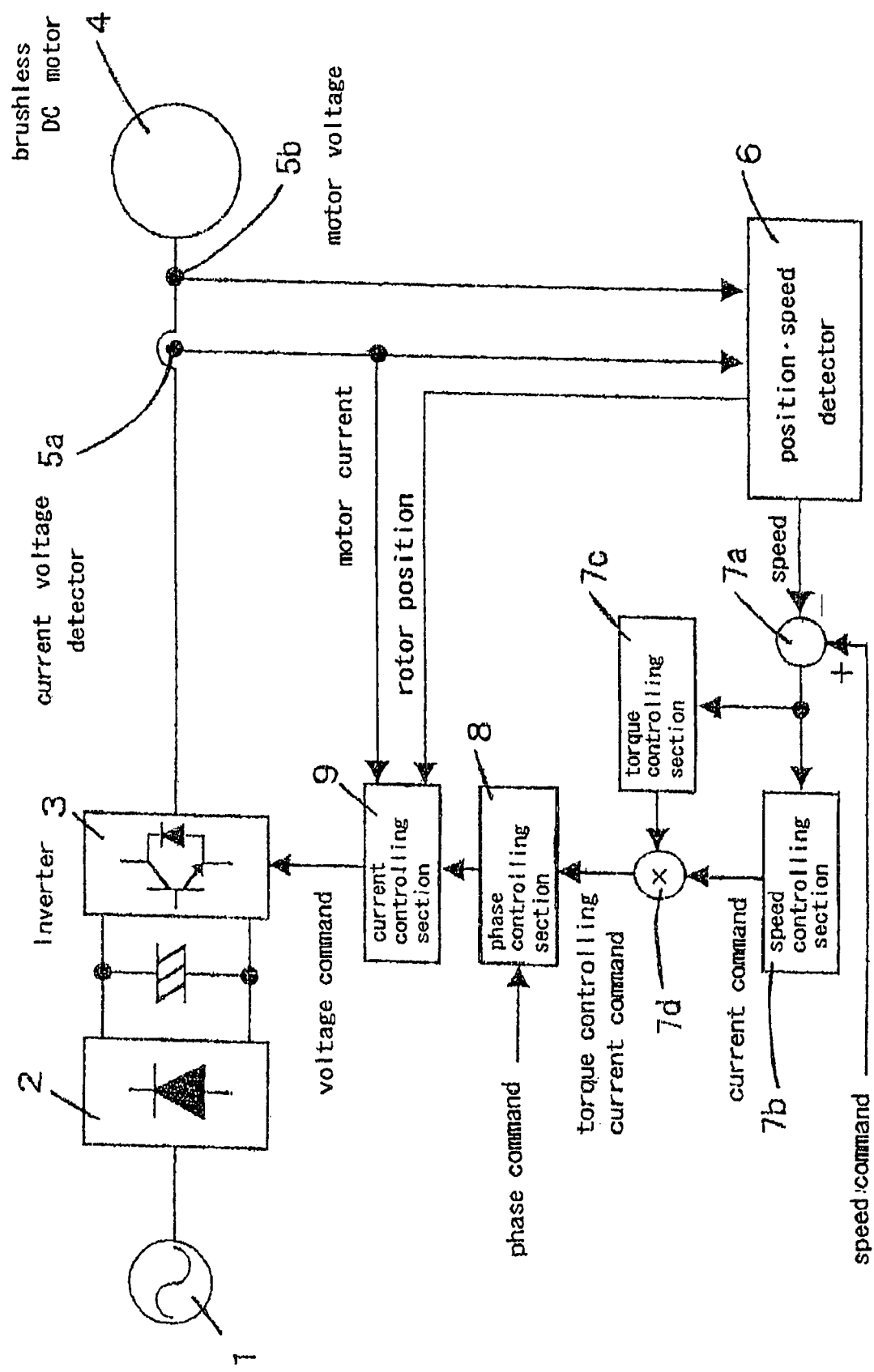
FIG. 1 is a block diagram illustrating a synchronous motor controlling apparatus of an embodiment according to the present invention.

FIG. 1 is a block diagram illustrating a synchronous motor controlling apparatus of an embodiment according to the present invention.

This synchronous motor controlling apparatus comprises a converter 2, inverter 3, current detection section 5a, voltage detection section 5b, position and speed detection section 6, speed difference calculation section 7a, speed controlling section 7b, torque controlling section 7c, multiplication section 7d, phase controlling section 8, and current controlling section 9.

The converter 2 receives AC source 1 as input and outputs DC power.

The inverter 3 receives the DC power as input and outputs AC power and supplies the AC power to a synchronous motor 4.

The current detection section 5a detects a motor current supplied to the synchronous motor 4.

The voltage detection section 5b detects a voltage at a terminal of the synchronous motor 4.

The position and speed detection section 6 receives the motor current and voltage as inputs, carries out a predetermined operation, and detects a rotation speed of a rotor (hereinafter, simply referred to as speed) and a rotation position of the rotor (hereinafter, referred to as rotor position).

The speed difference calculation section 7a calculates a difference between the detected speed and a speed command provided from the exterior.

The speed controlling section 7b receives the speed difference as input, carries out a speed controlling operation, and outputs current command so that average speed becomes the command speed.

The torque controlling section 7c receives the speed difference as input, carries out torque controlling operation, and outputs current amplitude modulation signal for compensating the current command.

The multiplication section 7d multiplies the current command and the current amplitude modulation signal so as to obtain torque controlling current command.

The phase controlling section 8 receives the torque controlling current command and a phase command provided from the exterior as input, carries out a phase controlling operation so as to output final current command.

The current controlling section 9 receives the detected rotor position, motor current and final current command as inputs, carries out a current controlling operation so as to output voltage command for supplying to the inverter 3.

Figure 2:
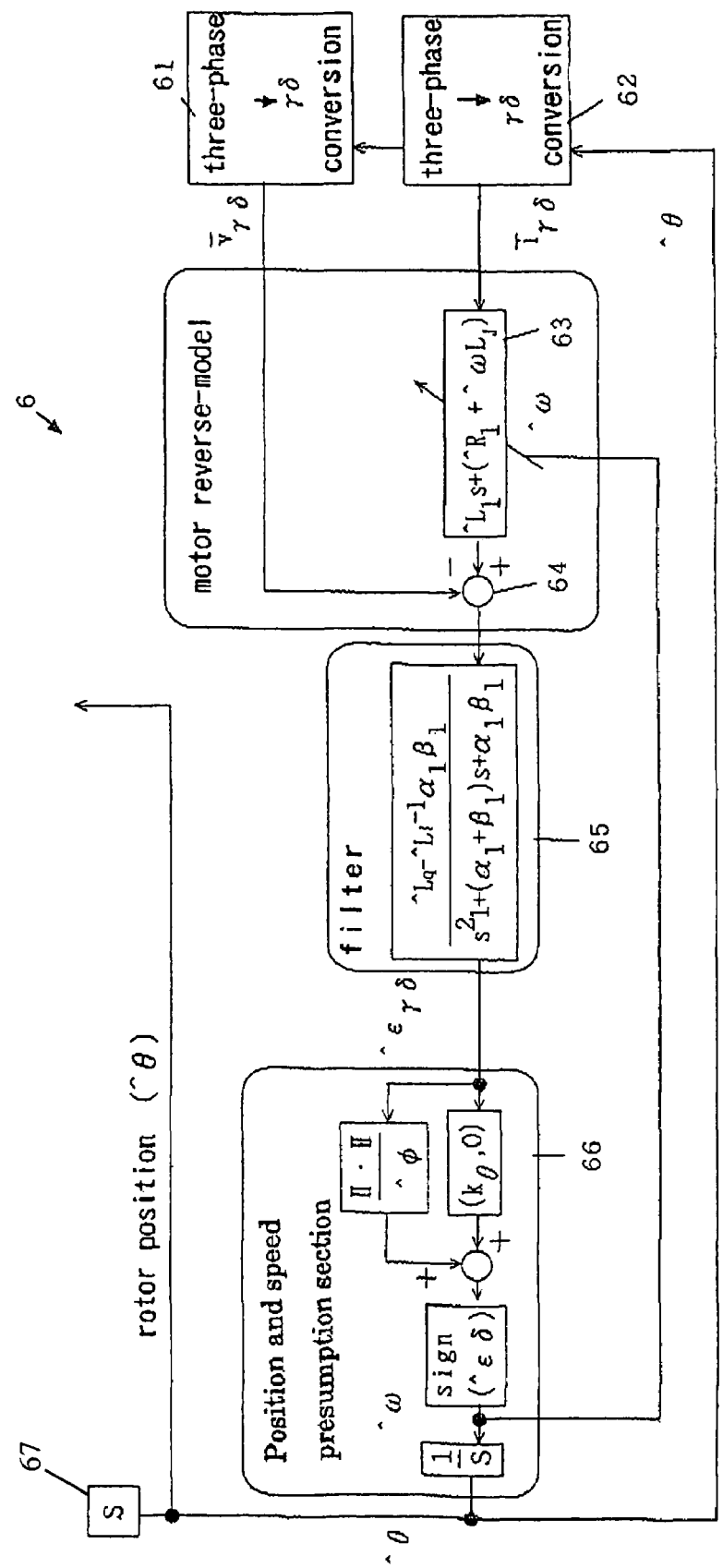
FIG. 2 is a block diagram illustrating an example of an arrangement of a position and speed detection section.

FIG. 2 is a block diagram illustrating an arrangement of an embodiment of the position and speed detection section 6.

This position and speed detection section 6 comprises a three phase→γδ conversion section 61, three phase→γδ conversion section 62, motor reverse model section 63, difference calculation section 64, filter 65, position detection section 66, and differential section 67.

The three phase→γδ conversion section 61 receives the three phase voltages as input in response with the rotor position (^θ), carries out γδ conversion (carries out conversion from three phase voltages to d-q axes voltages, multiplies the matrix (1) to the d-q axes voltages, and carries out conversion to the estimated axes γ-δ axes voltages, the estimated axes γ-δ axes having deviation by—$θ_e$ in electric angle in a rotation direction from the d-q axes) so as to output γδ voltage vector.

$$\begin{bmatrix} \cos θ_e & -\sin θ_e \\ \sin θ_e & \cos θ_e \end{bmatrix} \qquad \text{Matrix (1)}$$

The three phase→γδ conversion section 62 receives the three phase currents as input in response with the rotor position (^θ), carries out γδ conversion so as to output γδ current vector.

The motor reverse model section 63 receives the γδ current vector as input and outputs a voltage vector therefrom.

The difference calculation section 64 calculates a difference between the voltage vector output from the motor reverse model section 63 and the voltage vector output from the three phase→γδ conversion section 61.

The filter 65 receives the difference output from the difference calculation section 64 as input.

The position detection section 66 receives the output from the filter as input and carries out detection of a rotor position (θ).

The differential section 67 receives the rotor position (^θ) as input and carries out differential operation so as to output speed.

In FIG. 2, various quantities are defined as illustrated in the formula (2).

| Definition of Various Quantities | | | formula (2) |
|---|---|---|---|
| $\theta$: electric angle<br>$\omega$: electric angular speed | $I \equiv \begin{bmatrix} 1 & 0 \\ 0 & 1 \end{bmatrix}$ | $T(\theta_e) \equiv \begin{bmatrix} \cos\theta_e & -\sin\theta_e \\ \sin\theta_e & \cos\theta_e \end{bmatrix}$ | |
| $v_\gamma, v_\delta$: $\gamma\,\delta$ axes voltage | $v_{\gamma\delta} \equiv (v_\gamma, v_\delta)^T$ | | |
| $i_\gamma, i_\delta$: $\gamma\,\delta$ axes current | $i_{\gamma\delta} \equiv (i_\gamma, i_\delta)^T$ | $\alpha_I \equiv \begin{bmatrix} \alpha_\gamma & 0 \\ 0 & \alpha_\delta \end{bmatrix}$ | |
| $\epsilon_\gamma, \epsilon_\delta$: $\gamma\,\delta$ axes induced voltage<br>$\phi$: armature flux linkage | $\varepsilon_{\gamma\delta} \equiv (\varepsilon_\gamma, \varepsilon_\delta)^T$ | $\beta_I \equiv \begin{bmatrix} \beta_\gamma & 0 \\ 0 & \beta_\delta \end{bmatrix}$ | |
| R: armature resistance | $L_I \equiv \begin{bmatrix} Ld & 0 \\ 0 & Lq \end{bmatrix}$ | | |
| $L_d, L_q$: dq axes inductance<br>s represents differential operator | $L_J \equiv \begin{bmatrix} 0 & -Lq \\ Ld & 0 \end{bmatrix}$ | | |
| hat $\wedge$ represents estimation value | $\theta_e \equiv \theta - \hat{\theta}$ | | |

In this case, the rotor position ($\hat{\theta}$) is detected using the rotating coordinate motor model.

Also, in this case, it is preferable that a motor which is small in $|L_d - L_q|$ (so-called synchronous motor with surface magnet arrangement in which permanent magnets are mounted on the surface of the rotor) as the synchronous motor 4 so that error is prevented from generation. Description is made in more detail for this point.

Figure 8:
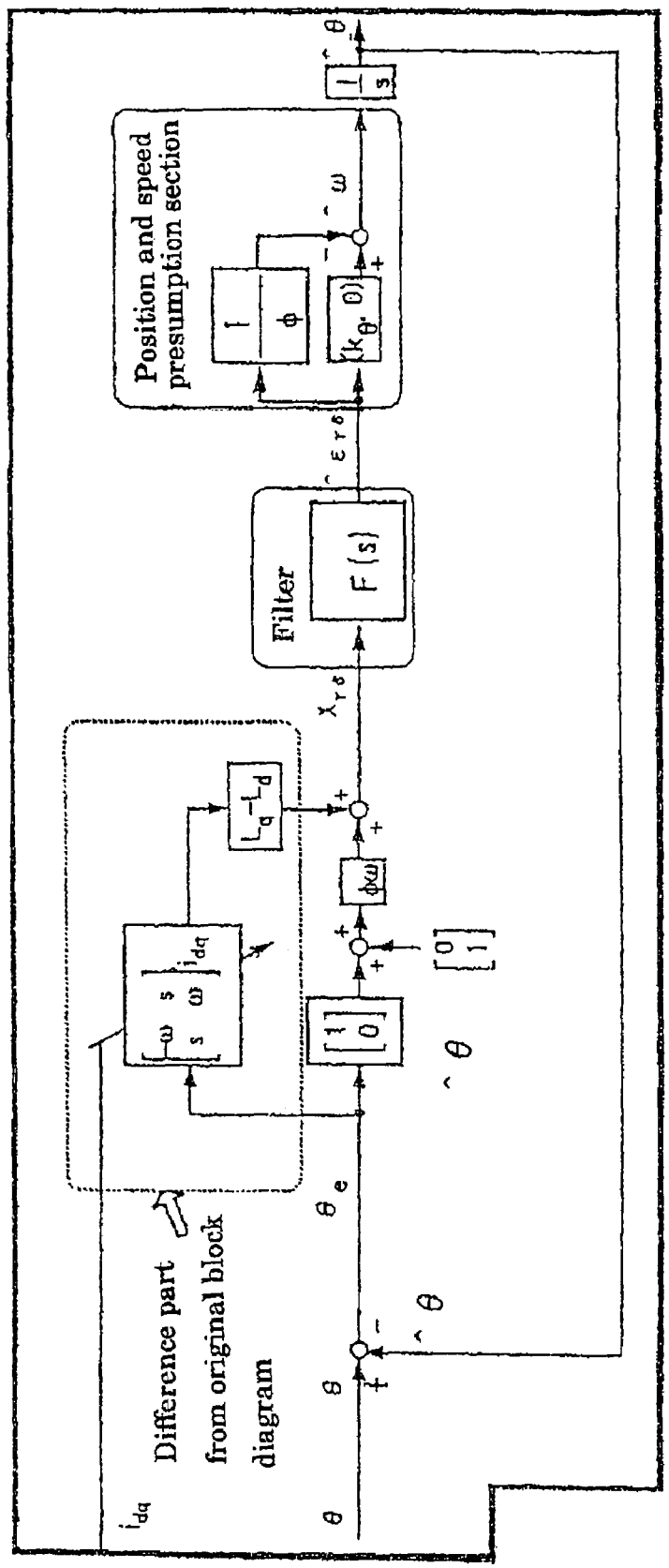
FIG. 8 is a block diagram illustrating an arrangement of a position detector which is linearly approximated to the position detector of FIG. 7.

As is illustrated in FIG. 8, when the rotating coordinate motor model is used, when a difference $\theta_e$ between the true rotor angle (rotor position) $\theta$ and the estimated rotor angle (estimated rotor position) $\hat{\theta}$ and when a salient pole ratio is great ($|L_d - L_q|$ is great), the difference $\theta_e$ is multiplied with $I_{dq}$, $\omega$ and the multiplication results are transmitted to the latter stages. Therefore, the output of the motor reverse model generates error therein due to variation in $I_{dq}$ (fundamental wave component has become direct current because it has converted into rotating coordinates) so that estimated result itself generates error, in a usage case which always generates the difference $\theta_e$ due to load variation and drives by eliminating the error by the feedback operation.

The torque controlling section 7c generates periodic torque variation waveform (current amplitude modulation signal) based upon the speed difference so that the periodic speed variation is suppressed. This periodic torque variation waveform is used to obtain the torque controlling current command by being superimposed to the current command.

The phase command is given from moment to moment in response with the controlling purpose such as maximum efficiency, maximum torque, and field weakening controlling.

Operation and effect of the synchronous motor controlling apparatus having the above arrangement are as follows.

The rotor position ($\theta$) and speed are detected by detecting the motor currents and voltages and by supplying them to the position and speed detection section 6.

Then the current command is obtained by supplying the speed difference between the detected speed and the speed command to the speed controlling section 7.

Also, the periodic torque variation waveform is generated by supplying the speed difference to the torque controlling section 7c.

The current command (final current command) applied to phase controlling is obtained by superposing the current command thus obtained and the waveform signal and by supplying the superposed result to the phase controlling section 8. This final current command is supplied to the current controlling section 9, while the motor currents and the rotor position ($\theta$) are also supplied to the current controlling section 9, so that the voltage command is obtained. Then the inverter 3 is controlled by the voltage command, and the synchronous motor 4 is controlled by supplying the output from the inverter 3 to the synchronous motor 4.

Therefore, the voltage utilization rate is improved. Affection due to the motor characteristics are greatly reduced. The rotation position detection is carried out more minutely and accurately so that the controllability is improved. Reduction of noise and improvement in efficiency are realized. Further, the synchronous motor 4 can be driven without speed variation so that sufficient suppression in vibration is realized even when the load has periodic torque variation, by additionally carrying out the torque controlling.

In this embodiment, the voltage is directly detected, but the voltage may be detected from PWM pattern or the like for driving the inverter 3.

The torque controlling section 7c may be a section which reads out previously determined torque variation pattern in correspondence with the rotor position ($\theta$).

It is also possible that the current controlling section 9 is omitted and that the speed controlling system is arranged so as to create the voltage command directly.

Figure 3:
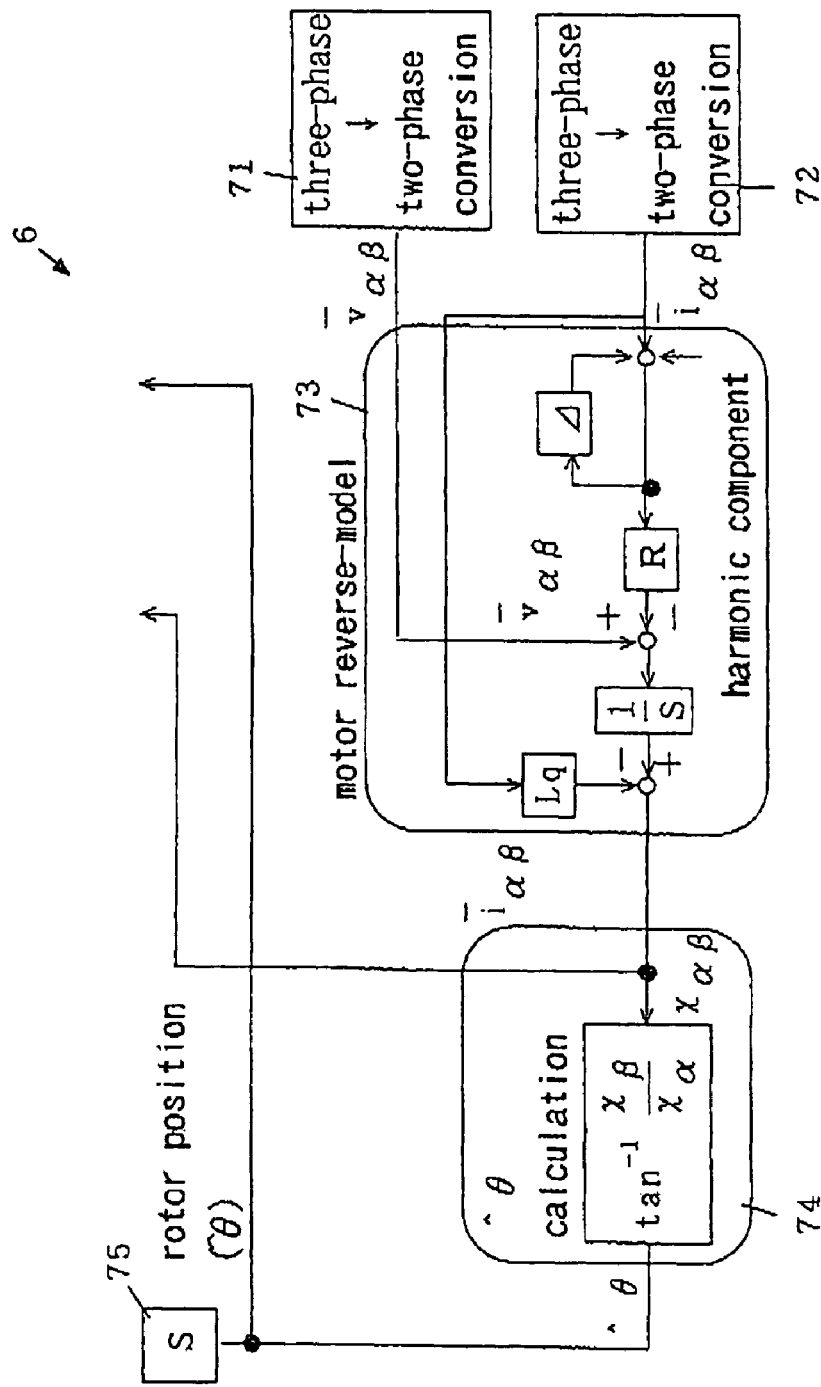
FIG. 3 is a block diagram illustrating another example of an arrangement of a position and speed detection section.

FIG. 3 is a block diagram illustrating an arrangement of the position and speed detection section 6 of another embodiment.

This position and speed detection section 6 is mainly different from the position and speed detection section 6 of FIG. 2 in that the fixed coordinate motor model is employed instead the rotating coordinate motor model.

This position and speed detection section 6 comprises a three phase→two phase conversion section 71, three phase→ two phase conversion section 72, motor reverse model section 73, rotor position calculation section 74, and differential section 75.

The three phase→ two phase conversion section 71 receives the three phase voltages as input, multiplies the matrix (3) to the three phase voltages, and outputs αβ voltage vector on the two phase orthogonal stator coordinates.

$$\sqrt{\frac{2}{3}}\begin{bmatrix} 1 & -\frac{1}{2} & -\frac{1}{2} \\ 0 & \frac{\sqrt{3}}{2} & -\frac{\sqrt{3}}{2} \end{bmatrix} \quad \text{matrix (3)}$$

The three phase→ two phase conversion section 72 receives the three phase currents as input, and outputs αβ current vector.

The motor reverse model section 73 receives the αβ current vector as input and obtains the voltage vector, calculates the difference between the obtained voltage vector and the voltage vector output from the three phase→ two phase conversion section 71, integrates the calculated difference, then calculates the difference between the integration result and the operation result based upon the αβ current vector and the q axis inductance $L_q$.

The rotor position calculation section 74 outputs the rotor position (^θ) by carrying out $\tan^{-1}$ operation for the output from the motor reverse model section 73.

The differential section 75 receives the rotor position (^θ) as input, and carries out differential operation so that the speed is output.

In FIG. 3, various quantities are given by the formula (4).

$$v\alpha, v\beta : \alpha\beta \text{ axes voltages } v_{\alpha\beta} \equiv (v_\alpha, v_\beta)^T$$

$$i\alpha, i\beta : \alpha\beta \text{ axes currents } i_{\alpha\beta} \equiv (i_\alpha, i_\beta)^T \quad \text{Equation (4)}$$

In this case, the rotor position (^θ) and the speed can be detected similarly to the position and speed detection section 6 of FIG. 2. The arrangement and the operation can be simplified in comparison to FIG. 2 because the rotating coordinate conversion and the like are not necessary.

There are no error propagation paths similarly to that of FIG. 8 in this case, therefore a motor having a greater salient pole ratio (so-called synchronous motor with embedded magnet arrangement in which permanent magnets are mounted in the interior of the rotor) can be employed as the synchronous motor 4.

Figure 4:
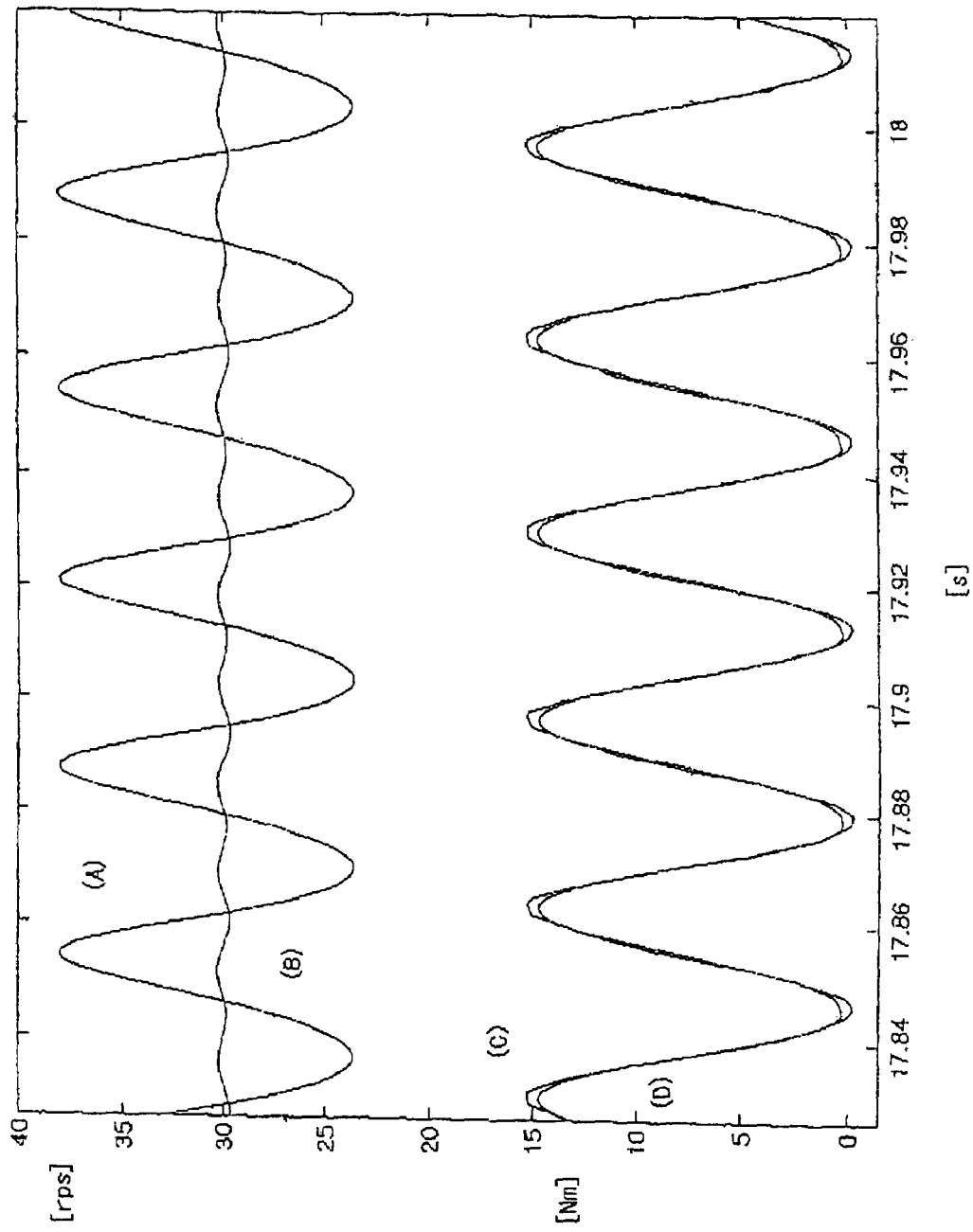
FIG. 4 is a diagram illustrating simulation result for speed variation improvement effect between the presence and non-presence of the torque controlling.

FIG. 4 is a diagram illustrating simulation result for speed variation improvement effect between the presence and non-presence of the torque controlling. Motor constants are as follows: R=0.2992 (Ω), $L_d$=5.5 (mH), $L_q$=12.7 (mH), and φ=0.1746 (wb). In FIG. 4, (A) represents the change in passage in time of the speed (rps) under a condition that there exist no torque controlling, while (B) represents the change in passage in time of the speed (rps) under a condition that there exists torque controlling, respectively. Also, in FIG. 4, (C) represents the motor torque (Nm) under a condition that there exists torque controlling, and (D) represents the load torque, respectively.

As is understood from FIG. 4, the speed variation is greatly suppressed by carrying out the torque controlling.

The position and speed detection section 6 of FIG. 3 is further described in contrast with the position and speed detection section 6 of FIG. 2.

In the position and speed detection section 6 of FIG. 2, there exists feedback of the estimated rotor position. Therefore, error is generated in the synchronous motor having a greater salient pole ratio due to the coordinate conversion based upon the estimated rotor position. In the position and speed detection section having feedback of estimated speed, as is illustrated in "Expanded Induced Voltage Observer For Sensor-less Controlling For Salient Pole Brush-less DC Motor", Chin Shiken et al., Heisei 11 nen (1999) Denkigakkai Zenkokutaikai, error is generated when the estimated speed changes because the position estimation result changes depending upon the estimated speed.

When feedback utilizing the estimated rotor position or estimated speed is used for obtaining the rotor position, the position and speed detection section 6 cannot be dealt with the rapid change of the command value, torque command, load and the like.

But, no error can be generated for rapid change of the command value, torque command, load and the like by directly obtaining the rotor position based upon the input terminal voltage and current of the synchronous motor, and the instrument constant of the synchronous motor.

Specifically, the estimated rotor position can be made unrelated with the motor model by employing the position and speed detection section 6 of FIG. 3. Therefore, the estimated speed can be made unrelated with the motor model in the order of flux. That is, the motor input currents and voltages are converted to those of orthogonal coordinates, then the voltage is integrated so as to convert in the order of flux, thereafter, the estimated rotor position can be calculated. Thus, feedback of the estimated rotor position, estimated speed is not needed at all, the rotor position can be directly obtained from the motor input by the operation which does not utilize the estimated rotor position, estimated speed directly. As a result, the position and speed detection section can follow without delay to the rapid change of the speed, voltage, current, torque, and the like.

The synchronous motor controlling apparatus of FIG. 1 is further described.

The conventional method for detecting the rotation position of the rotor from the input terminal voltage, current, and instrument constant of the synchronous motor, can detect the position accurately so that improvement in controlling accuracy can be expected. But, the conventional apparatus has an arrangement including the motor reverse model and filter, therefore delay is generated for changing load, and the controlling accuracy cannot sufficiently be improved.

On the contrary, speed change is suppressed by the torque controlling so that the affect of the delay is suppressed in a case of periodic load variation.

Therefore, the position detection accuracy is improved because the position detection error due to delay is eliminated by use the torque controlling together with the case that the method is applied to the periodic load variation which detects the rotation position of the rotor from the input terminal voltage, current and instrument constant of the synchronous motor (such usage together cannot be considered at all by one having the ordinary skill in the art). Good cycle can be realized such that accurate position detection causes more accurate torque controlling, and that accurate torque controlling causes more accurate position detection.

Figure 5:
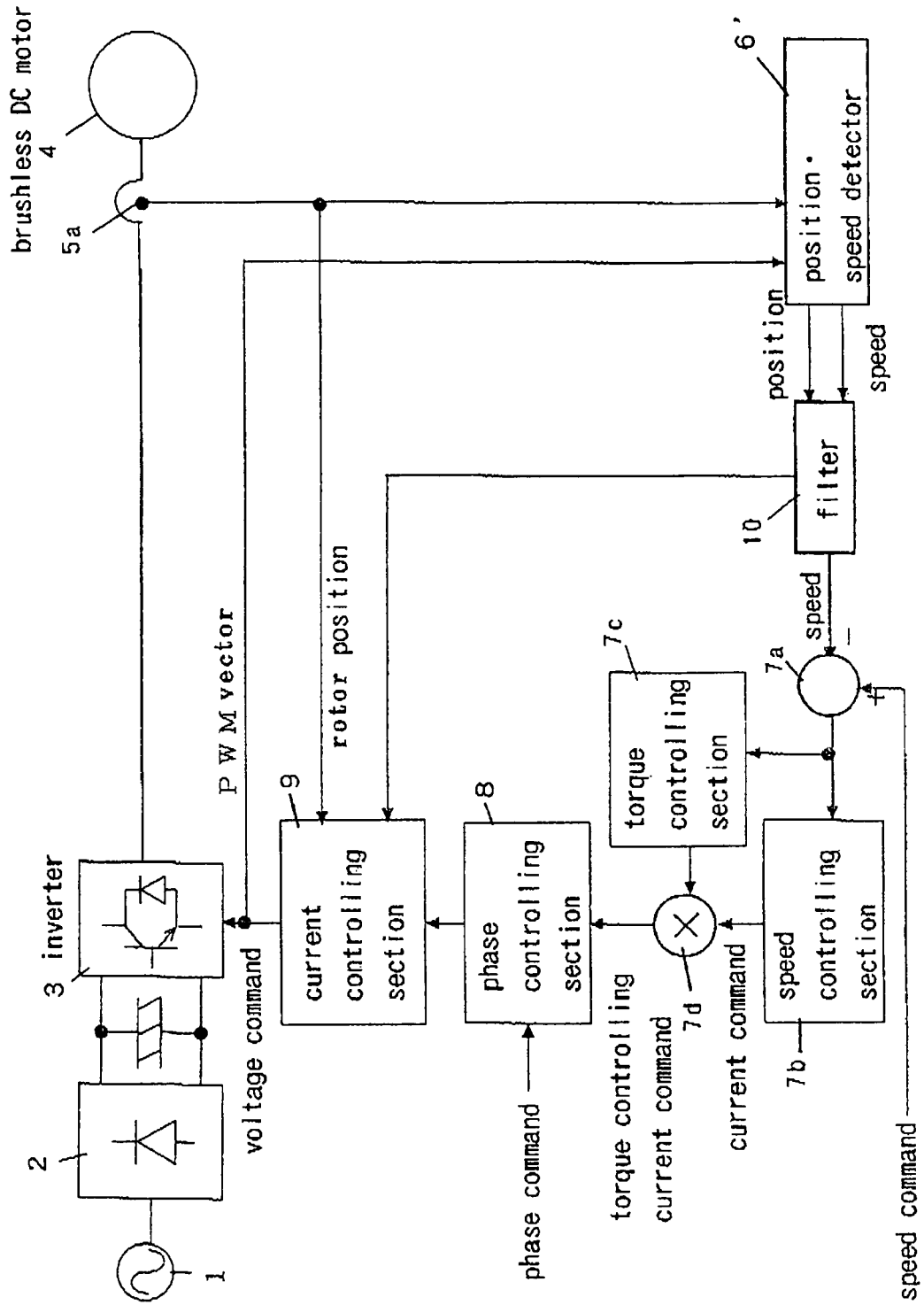
FIG. 5 is a block diagram illustrating a synchronous motor controlling apparatus of another embodiment according to the present invention.

FIG. 5 is a block diagram illustrating a synchronous motor controlling apparatus of another embodiment according to the present invention.

This synchronous motor controlling apparatus is different form the synchronous motor controlling apparatus of FIG. 1 in that a position and speed detection section 6' is employed instead the position and speed detection section 6, that the voltage detection section 5b is omitted, and that a filter 10 is further provided.

The position and speed detection section 6' receives the motor currents and the PWM vector output from the current controlling section 9 as input, and detects the rotation position and the speed.

The filter 10 removes noises from the calculated rotation position and speed.

The position and speed detection section 6' can detect the rotation position of the rotor and the speed from the input terminal voltage higher harmonics, current higher harmonics, and inductance distribution of the synchronous motor 4 by applying "Position Sensor-less IPM Motor Driving System Using Position Estimation Method Based Upon Salient Pole Characteristic", Ogasawara, Matsuzawa, Akagi, T. IEE Japan, Vol.118-D, No.5, '98.

When the synchronous motor controlling apparatus having the arrangement is employed, the detection accuracy in the rotation position and speed is improved due to the removal of noises by the filter 10. The voltage utilization rate is improved. The affect on the motor characteristics is greatly reduced. The rotation position detection can be made to be minute and accurate so that the controllability is improved. The reduction of noises and improvement of efficiency are realized. Further, the synchronous motor 4 can be driven without change in speed so that sufficient suppression in vibration is realized by additionally carrying out the torque controlling even when the load has periodic torque variation.

Figure 6:
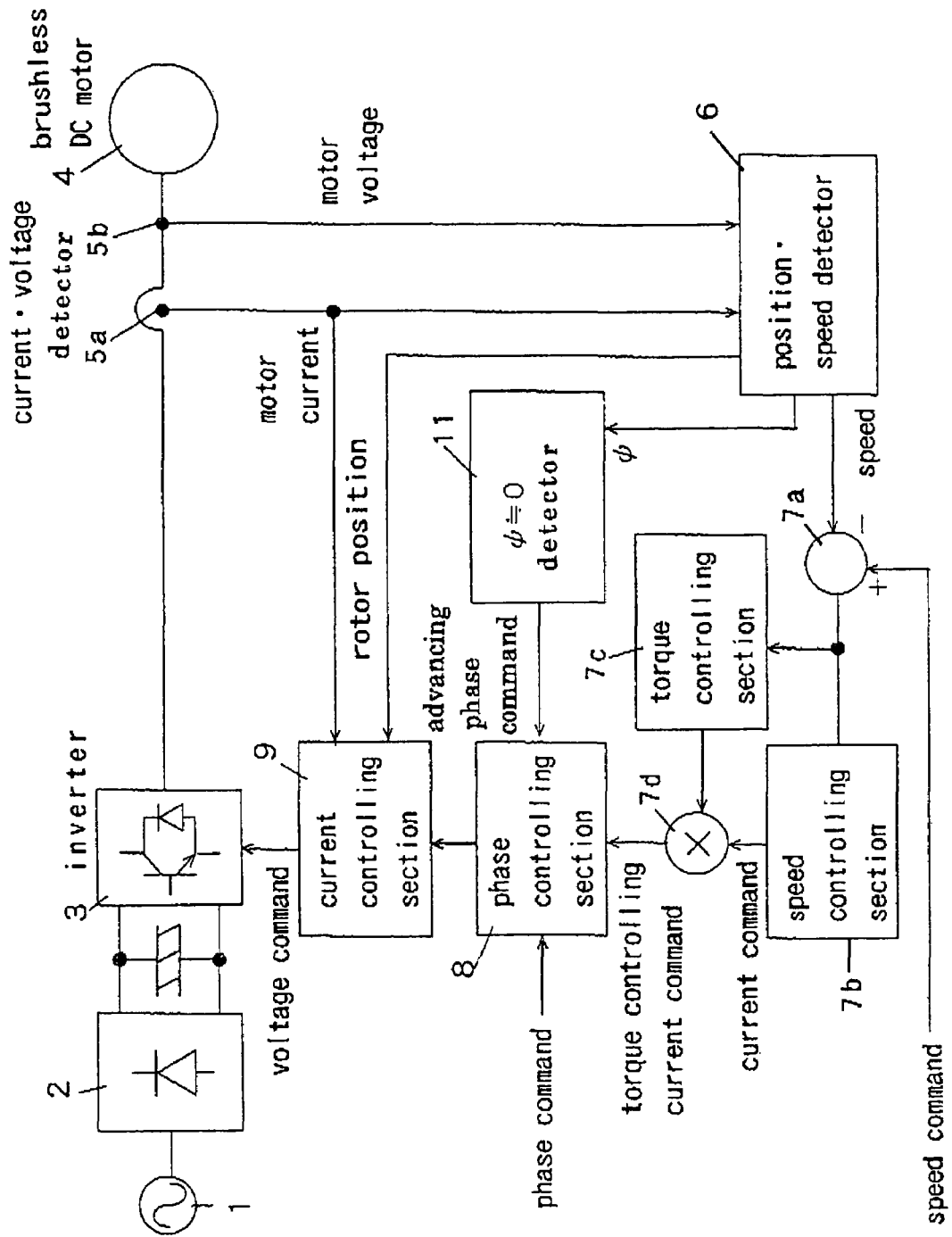
FIG. 6 is a block diagram illustrating a synchronous motor controlling apparatus of a further embodiment according to the present invention.

FIG. 6 is a block diagram illustrating a synchronous motor controlling apparatus of a further embodiment according to the present invention.

This synchronous motor controlling apparatus is different form the synchronous motor controlling apparatus of FIG. 1 in that the position and speed detection section 6 outputs flux $\Psi=(L_d-L_q)i_d+\phi$ in addition to the rotor position and speed, that a $\Psi\approx0$ detection section 11 is further provided, and that a phase controlling section for receiving phase advancing command in addition to the phase command and torque controlling current command as input and for outputting the final current command is employed as the phase controlling section 8.

The $\Psi\approx0$ detection section 11 receives the detected flux $\Psi$ as input, detects $\Psi\approx0$, and outputs the phase advancing command.

When the synchronous motor controlling apparatus having this arrangement is employed, flux $\Psi\approx0$ can be avoided in addition to the operation and effect of the synchronous motor controlling apparatus of FIG. 1.

Description is made further.

Figure 7:
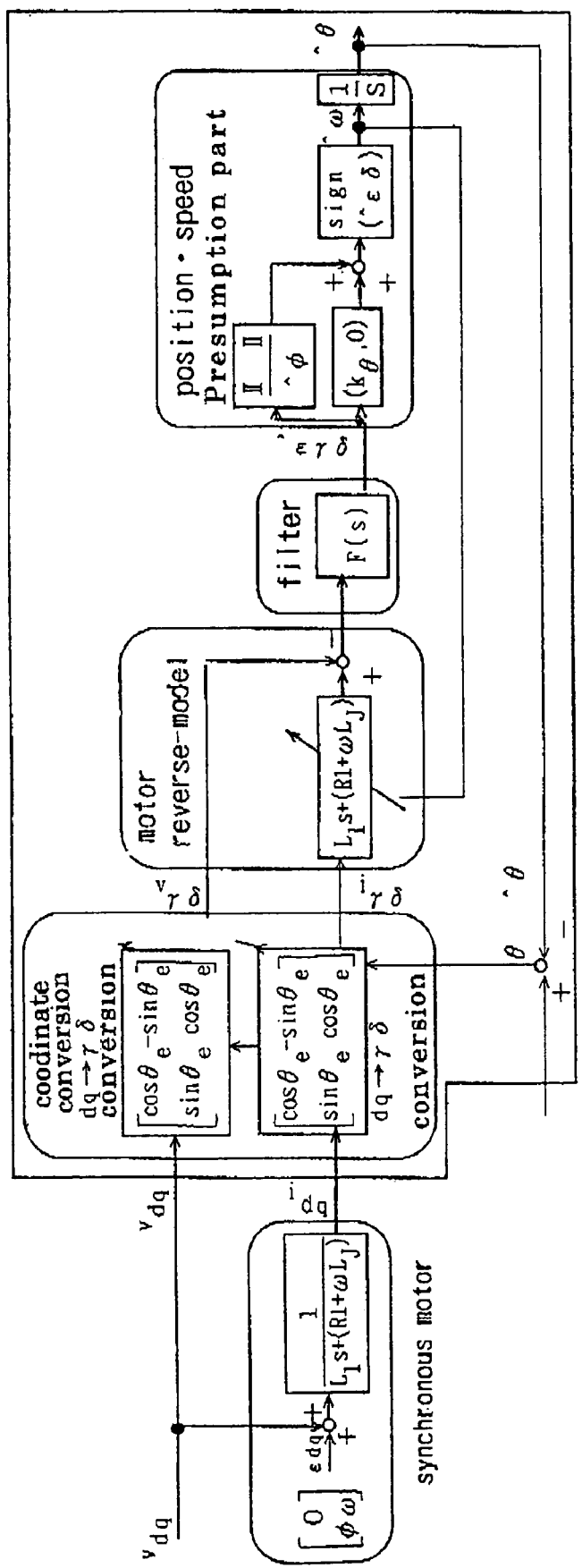
FIG. 7 is a block diagram illustrating an arrangement of a position detector which operates based upon the rotating coordinate motor model.

When substitute the coordinate conversion equation (10) for the equations (5), (6), (7), (8), and (9) which are recited in "Sensor-less Controlling of IPM Motor", motor technology symposium B-5, 99/March, and when rewritten as a system employing the motor reverse model and the feedback using the voltage $V_{dq}$ and current $i_{dq}$ on dq axes and the true rotor angle $\theta$, the position detector become the arrangement illustrated in FIG. 7.

$$\frac{d}{dt}\begin{bmatrix}i_d \\ i_q\end{bmatrix} = \begin{bmatrix}\frac{R_s}{L_d} & \frac{L_q}{L_d}\omega_R \\ \frac{L_q}{L_d}\omega_R & -\frac{R_s}{L_q}\end{bmatrix}\begin{bmatrix}i_d \\ i_q\end{bmatrix} + \begin{bmatrix}\frac{1}{L_d}v_d \\ \frac{1}{L_q}v_q\end{bmatrix} + \begin{bmatrix}\frac{1}{L_q}\phi_{mag}\omega_R \\ 0\end{bmatrix} \quad \text{Equation (5)}$$

$$\frac{d}{dt}\begin{bmatrix}\hat{i}_\gamma \\ \hat{i}_\delta \\ \hat{\varepsilon}_\gamma \\ \hat{\varepsilon}_\delta\end{bmatrix} = \begin{bmatrix}-\frac{R_s}{L_d} & \frac{L_q}{L_d}\omega_R & \frac{1}{L_d} & 0 \\ -\frac{L}{L_q}\omega_R & -\frac{R_s}{L_q} & 0 & \frac{1}{L_q} \\ 0 & 0 & 0 & 0 \\ 0 & 0 & 0 & 0\end{bmatrix}\begin{bmatrix}\hat{i}_\gamma \\ \hat{i}_\delta \\ \hat{\varepsilon}_\gamma \\ \hat{\varepsilon}_\delta\end{bmatrix} + \begin{bmatrix}\frac{1}{L_d} & 0 \\ 0 & \frac{1}{L_q} \\ 0 & 0 \\ 0 & 0\end{bmatrix}\begin{bmatrix}v_\gamma^* \\ v_\delta^*\end{bmatrix} + \begin{bmatrix}k_{01}k_{02} \\ k_{03}k_{04} \\ k_{05}k_{06} \\ k_{07}k_{08}\end{bmatrix}\begin{bmatrix}i_\gamma - \hat{i}_\gamma \\ i_\delta - \hat{i}_\delta\end{bmatrix} \quad \text{Equation (6)}$$

$$\hat{\omega}_{R_\phi}(k+1) = \frac{1}{\phi_{m0}} \cdot \text{sign}(\hat{\varepsilon}_\delta(k+1)) \cdot \sqrt{\hat{\varepsilon}_{\gamma^*}^2(k+1) + \hat{\varepsilon}_\delta^2(k+1)} \quad \text{Equation (7)}$$

$$\hat{\omega}_{R_\phi}(k+1) = \hat{\omega}_{R_\phi}(k+1) + \cdot \text{sign}(\hat{\varepsilon}_\delta(k+1)) \cdot K\theta \cdot \varepsilon\gamma(k+1) \quad \text{Equation (8)}$$

$$\hat{\theta}_x(k+1) = \theta_z(k) + \hat{\omega}_R(k+1) \cdot Y_S \quad \text{Equation (9)}$$

$$\begin{pmatrix}d_{\alpha+\theta} \\ q_{\alpha+\theta}\end{pmatrix} = \begin{pmatrix}\cos\theta & -\sin\theta \\ \sin\theta & \cos\theta\end{pmatrix}\begin{pmatrix}d_\alpha \\ q_\alpha\end{pmatrix} \quad \text{Equation (10)}$$

In FIG. 7, θ represents an electric angle, ω represents an electric angular speed, $v_\gamma$, $v_\delta$ represent γδ axes voltage, $i_\gamma$, $i_\delta$ represent γδ axes current, $\epsilon_\gamma$, $\epsilon_\delta$ represent γδ axes induced voltage, φ represents an armature flux linkage, R represents an armature resistance, $L_d$, $L_q$ represent dq axes inductance, s represents differential operator, and ^ represents estimation value, respectively. I, $v_{\gamma\delta}$, $i_{\gamma\delta}$, $\epsilon_{\gamma\delta}$, $L_1$, $L_j$, $\theta_e$, $T(\theta_e)$, $\alpha_1$, $\beta_1$, $i_{dq}$, $v_{dq}$ in FIG. 7 are represented in formula (11).

$$I \equiv \begin{bmatrix}1 & 0 \\ 0 & 1\end{bmatrix} \quad \text{Formula (11)}$$

$$V_{\gamma\delta} \equiv (V_\gamma, V_\delta)^T \quad T(\theta_e) \equiv \begin{bmatrix}\cos\theta_e & -\sin\theta_e \\ \sin\theta_e & \cos\theta_e\end{bmatrix}$$

$$i_{\gamma\delta} \equiv (i_\gamma, i_\delta)^T \quad \alpha_1 \equiv \begin{bmatrix}\alpha_\gamma & 0 \\ 0 & \alpha_\delta\end{bmatrix}$$

$$L_i \equiv \begin{bmatrix}L_d & 0 \\ 0 & L_q\end{bmatrix} \quad \beta_1 \equiv \begin{bmatrix}\beta_\gamma & 0 \\ 0 & \beta_\delta\end{bmatrix}$$

$$Lj \equiv \begin{bmatrix}0 & -L_d \\ L_d & 0\end{bmatrix} \quad idq \equiv (id, iq)^T$$

$$\hat{\theta} \equiv \theta - \hat{\theta} \quad vdq \equiv (vd, vq)^T$$

When the non-linear elements in the feedback loop are made to be linear elements (making $\cos\theta_e \to 1$, $\sin\theta_e \to \theta_e$, $\hat{\omega} \to \omega$), the block arrangement illustrated in FIG. 8 is obtained.

We consider the convergence in a case that $i_{dq}$ is periodic, using the block arrangement of FIG. 8. $X_\gamma$ is given by the formula (12) from the linear approximated block diagram.

$$X_y = \{\Phi\omega + (L_d - L_q)[\omega_1 - s]i_{dq}\}\theta_e \qquad \text{Formula (12)}$$

A case is considered that the interior of { } in the formula (12) is $a_0 + a_{1s} \sin\theta_1 + a_{1c}\cos\theta_1$, and $\theta_e = e_0 + e_{1s}\sin\theta_1 + e_{1c}\cos\theta_1 + e_{2s}\sin 2\theta_1 + e_{2c}\cos 2\theta_1$. Then, $X_\gamma$ becomes to be the formula (13).

Formula (13)

$$\begin{aligned}
X_y = & a_0 e_0 + (a_{1s}e_{1s} + a_{1c}e)/2 + & \leftarrow \text{DC component}\\
& (a_0 e_{1s} + a_{1s}e_0 + (-a_{1c}e_{2c} + a_{1c}e_{2s})/2)\sin\theta_1 + & \leftarrow \text{1st order}\\
& (a_0 e_{1c} + a_{1c}e_0 + (-a_{1s}e_{2s} + a_{1c}e_{2c})/2)\cos\theta_1 + & \leftarrow \text{2nd order}\\
& ((a_{1s}e_{1c} + a_{1c}e_{1s})/2 + a_0 e_{2s})\sin 2\theta_1 + & \\
& ((a_{1c}e_{2c} - a_{1s}e_{1s})/2 + a_0 e_{2s})\cos 2\theta_1 + & \\
& ((a_{1s}e_{2c} + a_{1c}e_{2c})2/\sin 3\theta_1 + (a_{1c}e_{2c} - a_{1s}e_{2s})/2\cos 3\theta_1 & \leftarrow \text{3rd order}
\end{aligned}$$

Though $\theta_e$ cannot be detected, the DC component and first order component of $x_\gamma$ are controlled to be 0 instead ($k_\theta \rightarrow \infty$ is needed), then $e_0$, $e_{1s}$, $e_{1c}$ are adjusted so that the dashed line section within the formula (12) becomes 0. To realize the object ($e_0 = e_{1s} = e_{1c} = 0$) from the formula (12), it is sufficient that $a_0 \neq 0$, and that $a_{1s} = a_{1c} = 0$. The former is equivalent to the fact that the average value of $\{\phi + (L_d - L_q)i_d\}\omega$ is not 0, while the latter is equivalent to the fact that the first order component and second order component of $\{\phi\omega + (L_d - L_q)[\omega_s - s]i_{dq}\}$ are 0. This is equivalent to the fact that $\omega$ is constant, and $L_d = L_q$ or $i_d$, $i_q$ are constant.

As a result, the sufficient condition for $\hat{\theta} \rightarrow \theta$ is stable and satisfying (1) $\theta_e$ is small ($\cos\theta_e \rightarrow 1$, $\sin\theta_e \rightarrow \theta_e$), (2) instrument constants (R, $L_d$, $L_q$) other than $\phi$ has no shifting, (3) $k_\theta = \infty$, (4) $\hat{\omega} = \omega = $ constant, (5) $L_d = L_q$ or $i_d$, $i_q$ are constant, and (6) the average value of $\{\phi + (L_d - L_q)i_d\}\omega$ is not 0. $(L_d - L_q)i_d + \phi \neq 0$ and securing stability are absolute condition for the position detection, but others are conditions for reducing error.

Figure 9:
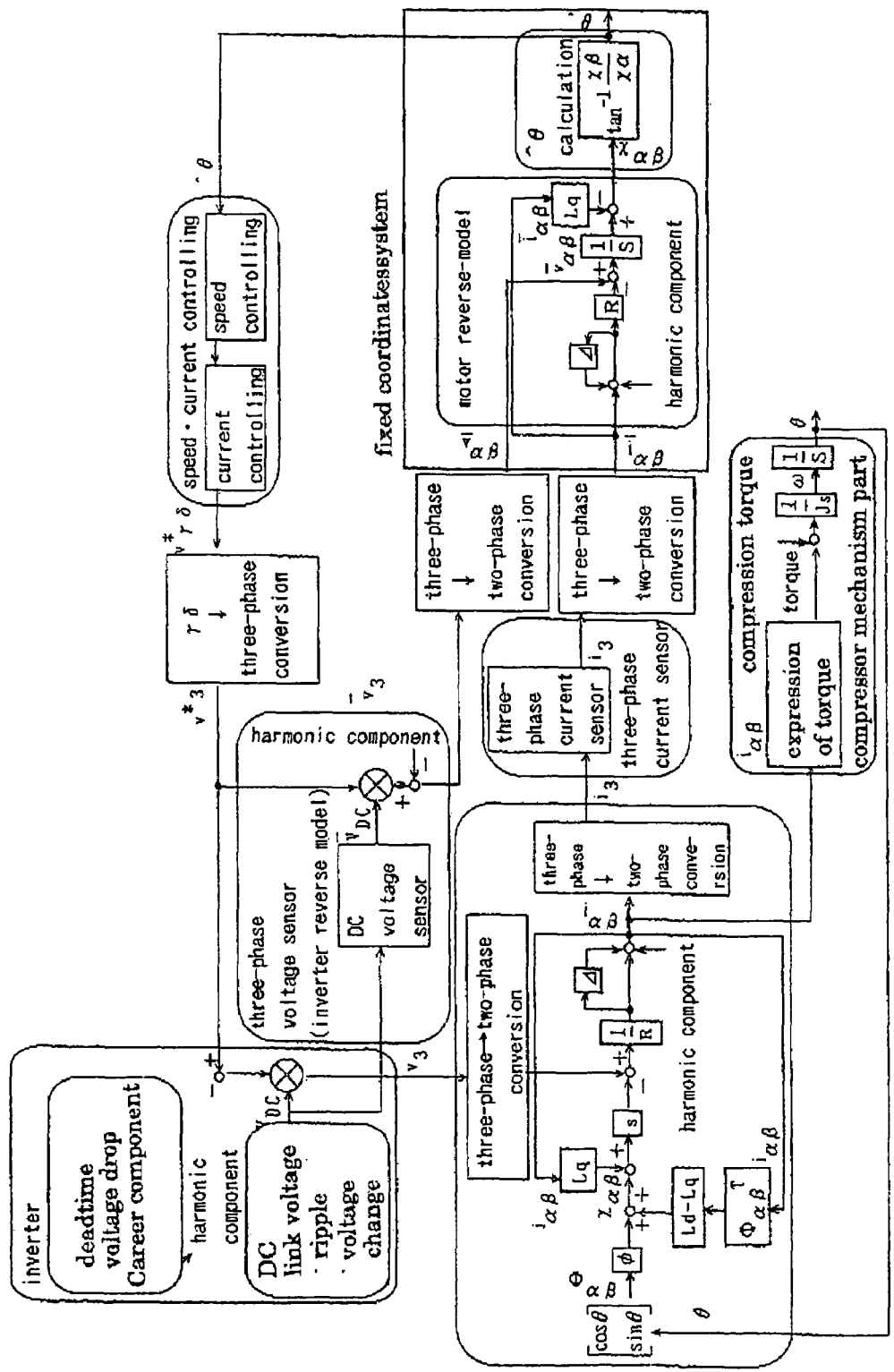
FIG. 9 is a block diagram illustrating an arrangement of a position detector which operates based upon the fixed coordinate motor model.

Other block arrangement is illustrated in FIG. 9 for carrying out the position detection using the motor reverse model and without sensors.

In FIG. 9, $\theta$ represents an electric angle, c represents an electric angular speed, $\gamma\delta$ coordinate is $\hat{\theta}$ rotating coordinate, $\alpha\beta$ coordinate is two phase orthogonal stator coordinate, $v_\gamma$, $v_\delta$ represent $\gamma\delta$ axes voltage, $v_\alpha$, $v_\beta$ represent $\alpha\beta$ axes voltage, $i_\alpha$, $i_\beta$ represent $\alpha\beta$ axes current, $\phi$ represents an armature flux linkage, R represents an armature resistance, $L_d$, $L_q$ represent dq axes inductance, s represents differential operator, and $\hat{\ }$ represents estimation value, respectively. $v_{\gamma\delta}$, $v_{\alpha\beta}$, $i_{\alpha\beta}$, $\Phi_{\alpha\beta}$, $f(\theta)$ in FIG. 9 are represented in formula (14).

$$v_{\gamma\delta} \equiv (v_\gamma, v_\delta)^T \qquad f(\theta) \equiv \begin{bmatrix} \cos 2\theta & \sin\theta \\ \sin\theta & -\cos\theta \end{bmatrix} \qquad \text{Formula (14)}$$

$$v_{\alpha\beta} \equiv (v_\alpha, v_\beta)^T = 2\begin{bmatrix} \cos^2\theta & \sin\theta\cos\theta \\ \sin\theta\cos\theta & \sin^2\theta \end{bmatrix}$$

$$i_{\alpha\beta} \equiv (i_\alpha, i_\beta)^T \qquad -\begin{bmatrix} 1 & 0 \\ 0 & 1 \end{bmatrix}$$

$$\Phi_{\alpha\beta} \equiv (\cos\theta, \sin\theta)^T = 2\Phi_{\alpha\beta}^T \Phi_{\alpha\beta} - 1^{2\times 2}$$

It is understood that $\{(L_d - L_q)\Phi_{\alpha\beta}^T + \phi\} = (L_d - L_q)i_d + \phi \neq 0$ is the condition for position detection, even when this block arrangement is employed.

Figure 10:
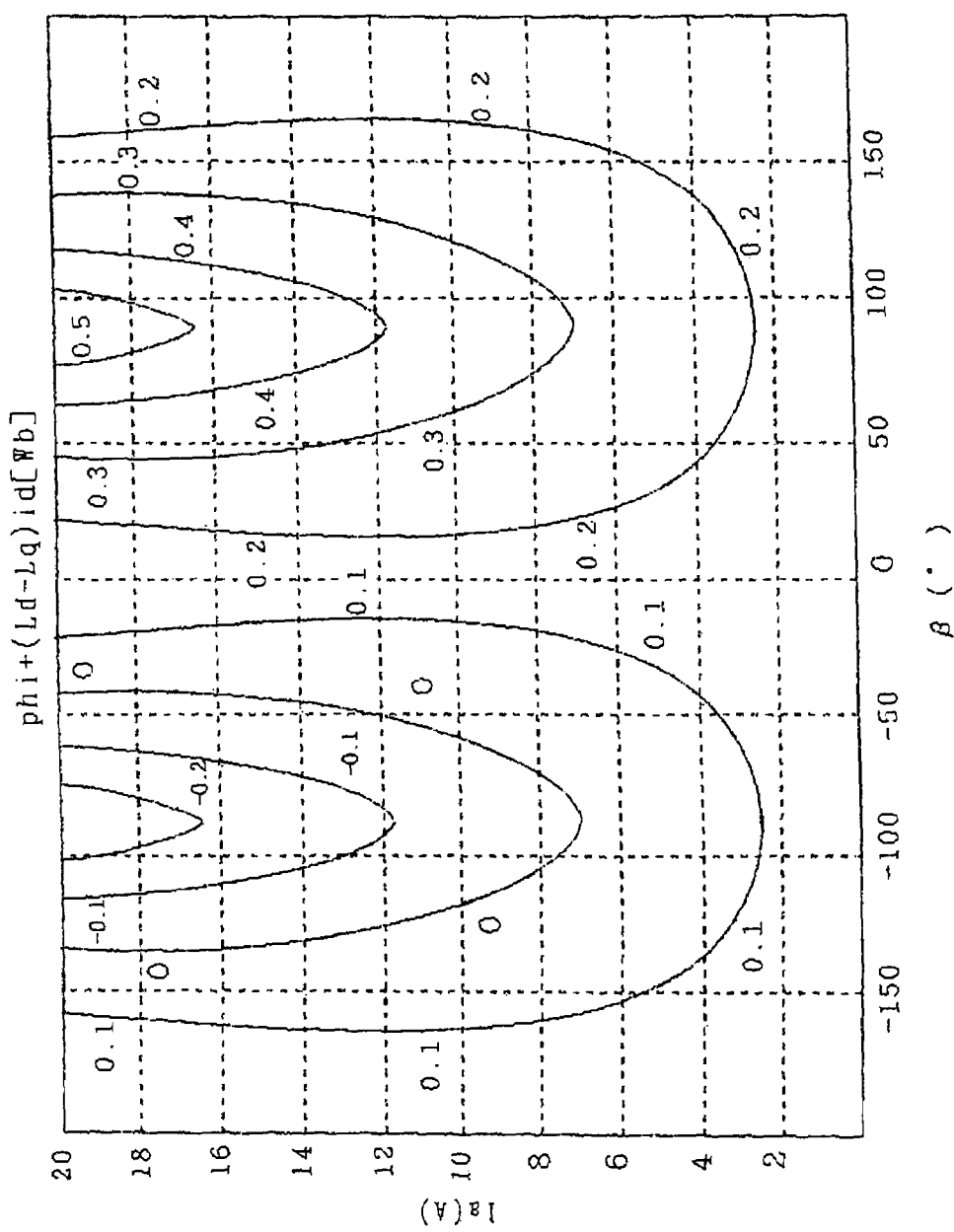
FIG. 10 is a diagram illustrating a current phase with respect to the d-axis and $(L_d - L_q)i_d + \phi$ with respect to the current value which has transformed into two phase.

FIG. 10 is a diagram illustrating a current phase with respect to the d-axis and $\Psi = (L_d - L_q)i_d + \phi$ with respect to the current value which has transformed into two phase.

$\Psi = 0$ is confirmed within a region where the current phase is from $-50$ degree to $-130$ degree and $I_a > 7$ A, it is understood that position detection may be impossible within this region. $I_a$ is $(3/2)^{1/2}$ of the peak value of the phase current of the three phase motor.

In the synchronous motor controlling apparatus of FIG. 6, the flux $\Psi$ is detected by the position and speed detection section 6. It is possible that the flux $\Psi \approx 0$ is estimated from the current phase and the current value. It is also possible that a flux calculation section for calculating the flux $\Psi$ is separately provided.

In each of the above embodiments, it is possible that the torque controlling is realized by determining the feedback gain for the frequency component of rotating speed variation to be infinite.

Description is made further.

Figure 11:
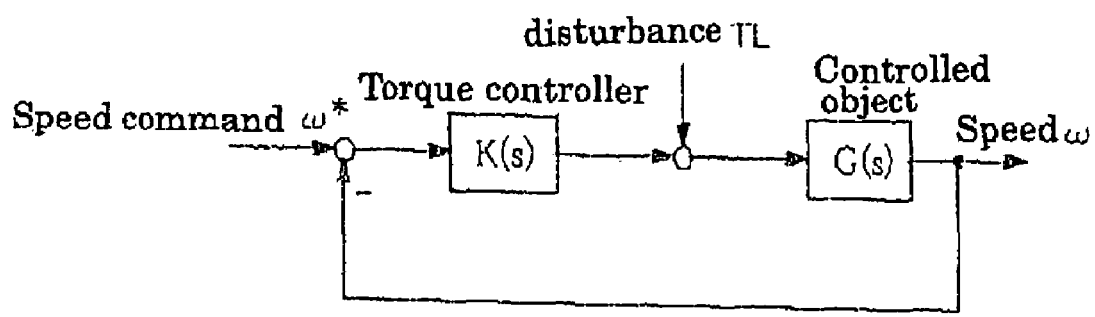
FIG. 11 is a block diagram illustrating a control system employing a torque controller.
Figure 12:
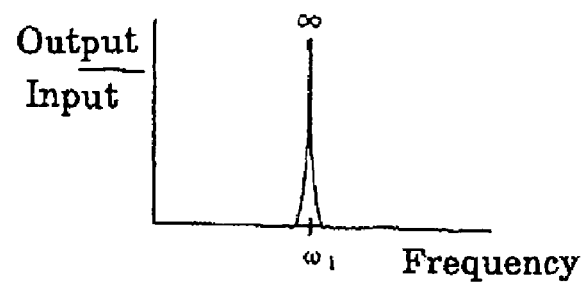
FIG. 12 is a diagram illustrating gain characteristics of the torque controller.

When complex variable of Laplace transform is represented with s, speed is represented with $\omega$, speed command is represented with $\omega^*$, disturbance is represented with TL, torque controller is represented with K(s), transfer function from the output to input of the torque controller is represented with G(s), rational function being a component of K(s) is represented with C(s), frequency to be suppressed is represented with $\omega 1$, respectively, a block diagram of the controlling system using the torque controller becomes the block diagram illustrated in FIG. 11, and gain characteristics (output/input) of the torque controller becomes the characteristics illustrated in FIG. 12.

As is understood from FIG. 12, the gain for the frequency $\omega 1$ is infinite.

Therefore, the formula (15) is satisfied.

$$K(j\omega 1) = \infty \qquad \text{Formula (15)}$$

From the block diagram of FIG. 11, the speed $\omega$ is represented by the following formula.

$$\omega = [\{G(s)K(s)\}/\{1 + G(s)K(s)\}]\omega^* + [G(s)/\{1 + G(s)K(s)\}]TL \qquad \text{Formula (16)}$$

In general, the condition for the above formula being stable is that all real roots of the denominator polynomial of the rational function $\{1 + G(s)K(s)\}$ become negative. Further, K(s) includes the rational function C(s) which can be freely designed. Therefore, stability is realized by designing the C(s) so that all real roots of the denominator polynomial of the rational function $\{1 + G(s)K(s)\}$ become negative.

Speed for the frequency $\omega 1$ is considered when the controlling system is stable.

The formula (17) is obtained by substituting the formula (15) for formula (16).

Formula (17)

$$\omega = [\{G(j\omega 1)K(j\omega 1)\}/\{1 + G(j\omega 1)K(j\omega 1)\}]$$
$$\omega * + [G(j\omega 1)/\{1 + G(j\omega 1)K(j\omega 1)\}]TL$$
$$= [G(j\omega 1)/\{1/K(j\omega 1) + G(j\omega 1)\}]\omega * +$$
$$[\{G(j\omega 1)/K(j\omega 1)\}/\{1/K(j\omega 1) + G(j\omega 1)\}]$$
$$TL$$
$$= [G(j\omega 1)/(1/\infty + G(j\omega 1))]\omega * + [\{G(j\omega 1)/i\infty\}/$$
$$(1/\infty + G(j\omega 1))]TL$$
$$= [G(j\omega 1)/(0 + G(j\omega 1))]\omega * + [0/\{0 + G(j\omega 1)\}]TL$$
$$= 1 \times \omega * + 0 \times TL = \omega *$$

From the formula (17), it is understood that the component of frequency ω1 of the disturbance TL does not transfer to the speed ω, and that the component of frequency ω1 of the speed command ω* is identical with the speed ω.

Figure 13:
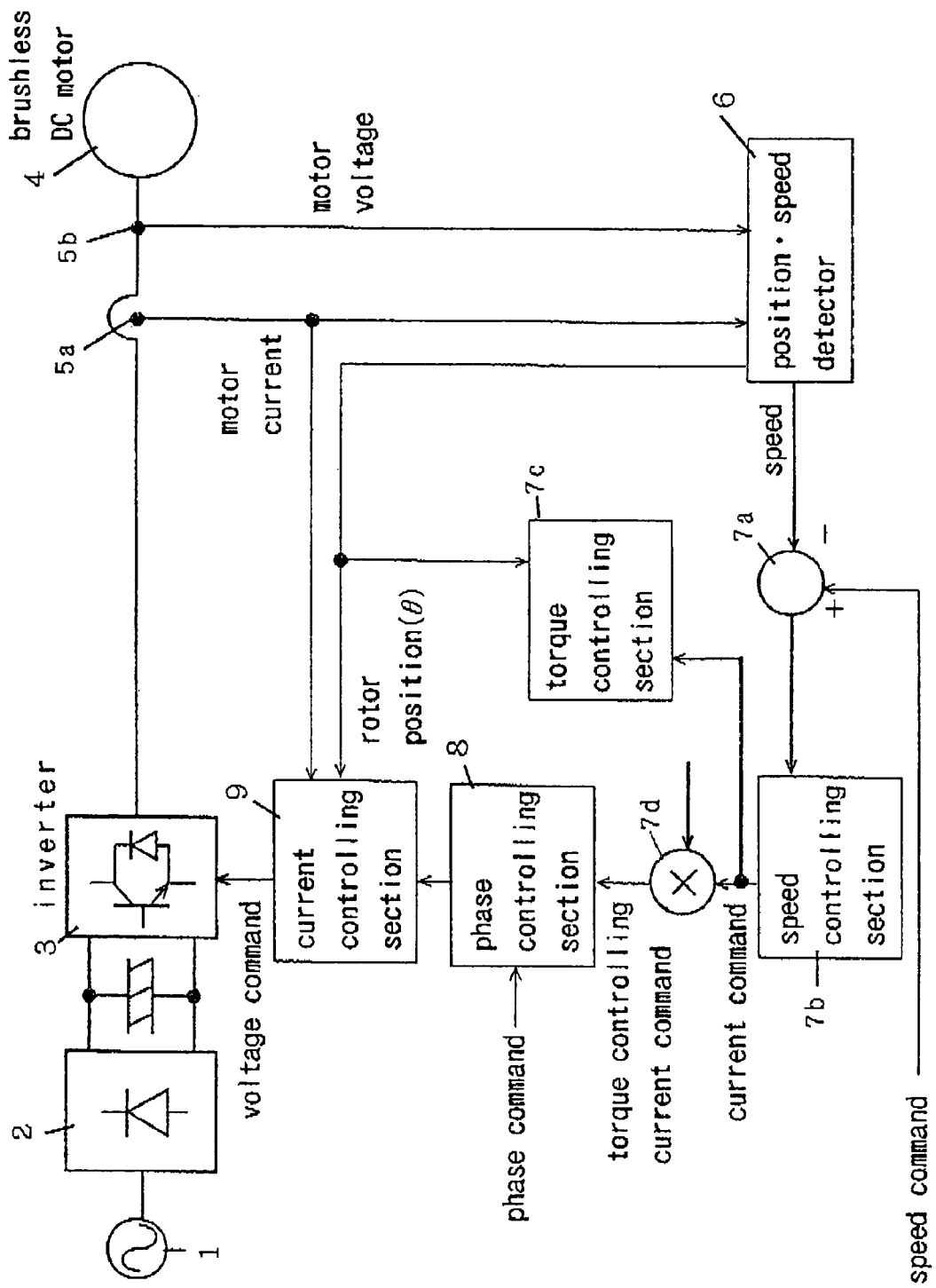
FIG. 13 is a block diagram illustrating a synchronous motor controlling apparatus of a further embodiment according to the present invention.

FIG. 13 is a block diagram illustrating a synchronous motor controlling apparatus of a further embodiment according to the present invention.

This synchronous motor controlling apparatus is different from the synchronous motor controlling apparatus of FIG. 1 in that a torque controlling section for receiving the current command from the speed controlling section 7b and the rotor position as input and for outputting the current amplitude modulation signal is employed as the torque controlling section 7c.

This torque controlling section 7c previously stores and holds the current pattern in response with the load variation. Therefore, the torque controlling section 7c receives the current command and the rotor position as input and outputs the corresponding current pattern as the current amplitude modulation signal. For simplification purpose, it is possible to construct the torque controlling section 7c that only the rotor position is received as input, and a waveform of a constant pattern corresponding to only the rotor position is output.

Therefore, in this case, the operation and effect similar to those of the embodiment of FIG. 1 are realized.

Figure 14:
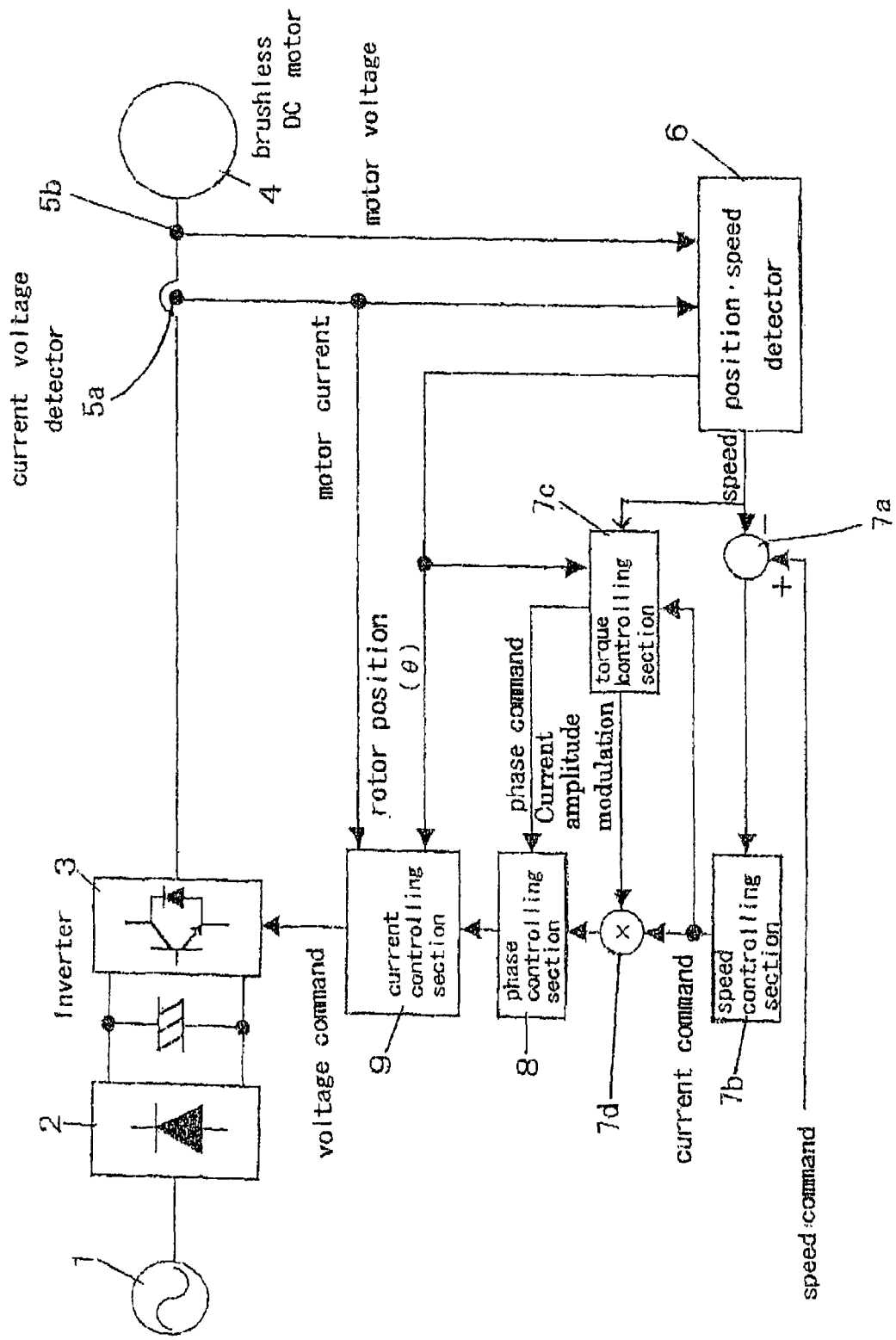
FIG. 14 is a block diagram illustrating a synchronous motor controlling apparatus of a further embodiment according to the present invention.

FIG. 14 is a block diagram illustrating a synchronous motor controlling apparatus of a further embodiment according to the present invention.

This synchronous motor controlling apparatus is different from the synchronous motor controlling apparatus of FIG. 13 in that a torque controlling section for receiving the detected speed, current command from the speed controlling section 7b and the rotor position as input and for outputting not only the current amplitude modulation signal but also current phase command is employed as the torque controlling section 7c.

Figure 15:
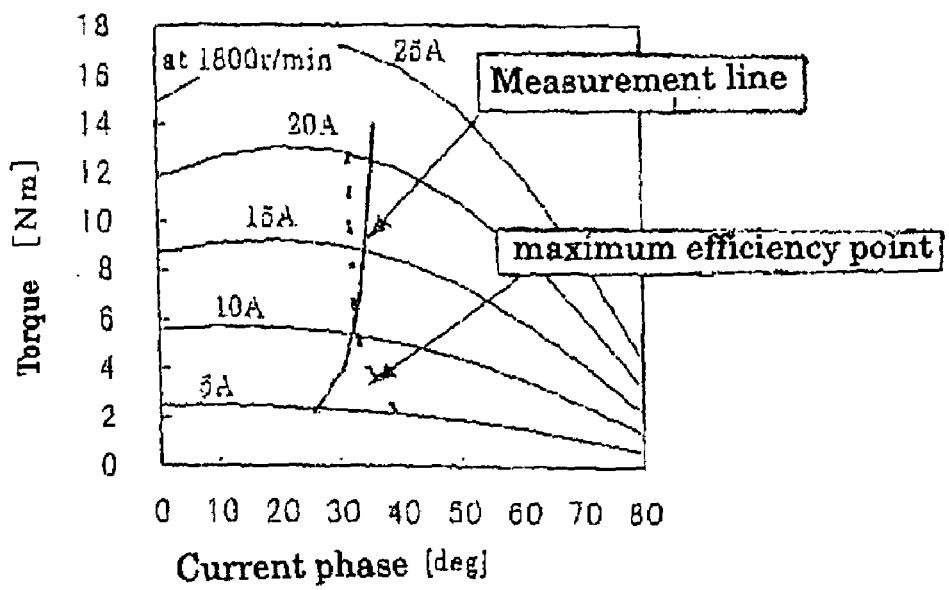
FIG. 15 is a diagram illustrating current phase characteristics of a synchronous motor having a magnet embedded arrangement.

When the synchronous motor controlling apparatus having this arrangement is employed, the torque controlling in maximum efficiency is realized by outputting the current phase command which rides on the line {refer to (A) and (B) in FIG. 15} representative of the current phase at the point where efficiency is maximum, for example, illustrated in FIG. 15.

The current phase command to be output may have plural patterns in response with the operation mode such as maximum efficiency, maximum torque, flux weakening controlling. The current phase command may be controlled its output based upon a command from the exterior.

It is possible that the current phase command output from the torque controlling section 7c is determined to be a constant value in the synchronous motor controlling apparatus of FIG. 14. In this case, the controlling can be simplified.

Even when this arrangement is employed, the line representing the current phase of the maximum efficiency point in FIG. 15 is about 30 degrees. Therefore, the torque controlling at near maximum efficiency is realized by determining the current phase command to be 30 degrees (constant value).

Figure 16:
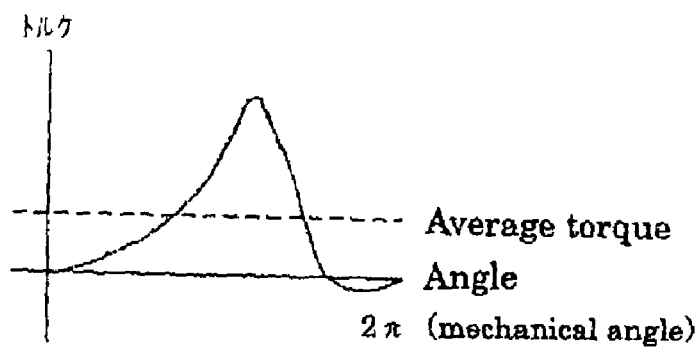
FIG. 16 is a diagram illustrating a torque pattern of a compressor for an air conditioner.

FIG. 16 is a diagram illustrating the torque pattern of the compressor for an air conditioner and average torque of an example.

As is understood from FIG. 16, instantaneous torque which is near three times of the average torque and negative torque are generated in the compressor for an air conditioner. Therefore, disadvantages such that greater vibration is generated, when the compressor for an air conditioner is driven without torque controlling for the synchronous motor. And, greater degree of energy saving is required for an air conditioner.

Therefore, it is preferable that one of the above synchronous motor controlling apparatus is employed as the synchronous motor controlling apparatus for controlling a synchronous motor for driving a compressor for an air conditioner so that the compressor for an air conditioner can be driven in a stable condition which has great load variation and is required to be driven at high speed.

Figure 17:
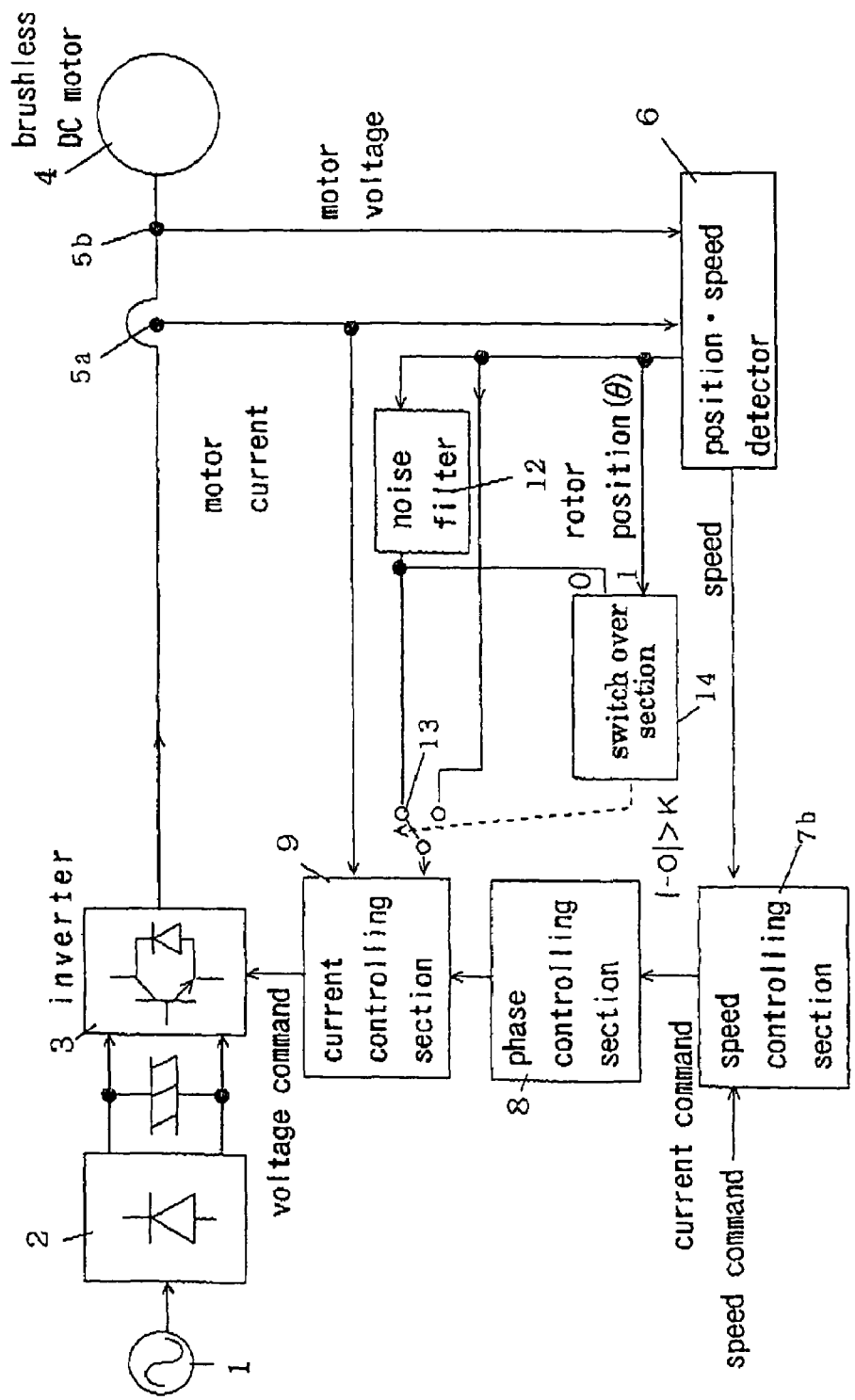
FIG. 17 is a block diagram illustrating a synchronous motor controlling apparatus of a further embodiment according to the present invention.

FIG. 17 is a block diagram illustrating a synchronous motor controlling apparatus of a further embodiment according to the present invention.

This synchronous motor controlling apparatus comprises a converter 2, inverter 3, current detection section 5a, voltage detection section 5b, position and speed detection section 6, speed controlling section 7b, phase controlling section 8, noise filter 12, selection section 13, switchover section 14, and current controlling section 9.

The converter 2 receives the AC power 1 as input and obtains DC power.

The inverter 3 receives the DC power as input, obtains the AC power, and supplies the AC power to a synchronous motor 4 which is a species of synchronous motors.

The current detection section 5a detects the motor current which is supplied to the synchronous motor 4.

The voltage detection section 5b detects the voltage at the terminal of the synchronous motor 4.

The position and speed detection section 6 is determined the motor model therein, receives the motor current and voltage as input, carries out the predetermined operation, and detects the speed of the rotor and rotor position.

The speed controlling section 7b receives the detected speed and the speed command provided from the exterior as input, carries out speed controlling operation, and outputs the current command so that the average speed becomes the instructed speed.

The phase controlling section 8 receives the current command as input, carries out the phase controlling operation, and outputs the final current command.

The noise filter 12 removes noise from the detected rotor position.

The selection section 13 selects the detected rotor position or the rotor position removed the noise therefrom.

The switchover section 14 compares the difference between the detected rotor position or the rotor position removed the noise therefrom with the threshold value, and controls the selection section 13 in response with the comparison result.

The current controlling section 9 receives the selected rotor position, motor current and final current command as input, carries out the current controlling operation so as to output the voltage command, and supplies the voltage command to the inverter 3.

The selection section 13 and switchover section 14 constitute a canceling means.

When the synchronous motor controlling apparatus having this arrangement is employed, and when the shifting in the rotor position removed noise therefrom becomes greater, over-current and decrease in torque are prevented from occurrence by employing the rotor position which is not removed noise therefrom.

Description is made further.

The noise filter 12 is incorporated for eliminating the effect of noise included within the detected rotor position signal. The noise filter 12 inevitably has delay so that shifting is inevitably generated in the rotor position when rapid speed change has occurred. But, in this embodiment, the switchover section 14 controls the selection section 13 for selecting the detected rotor position so that over-current and decrease in torque due to the time lag in rotor position are prevented from occurrence under the condition that the difference between the detected rotor position and the rotor position removed noise therefrom is greater than the threshold value.

Figure 18:
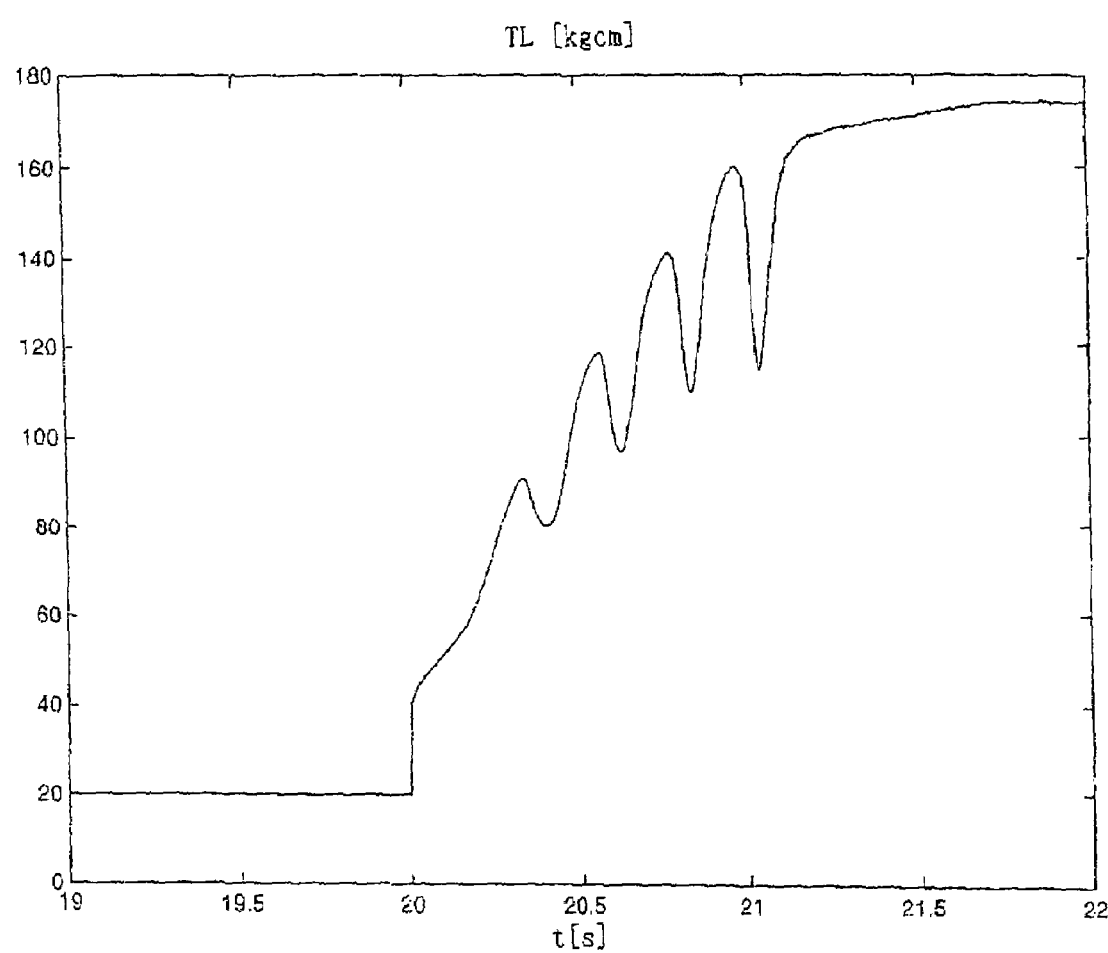
FIG. 18 is a diagram illustrating simulation result of change in passage of time of load torque obtained by the synchronous motor controlling apparatus of FIG. 17.
Figure 19:
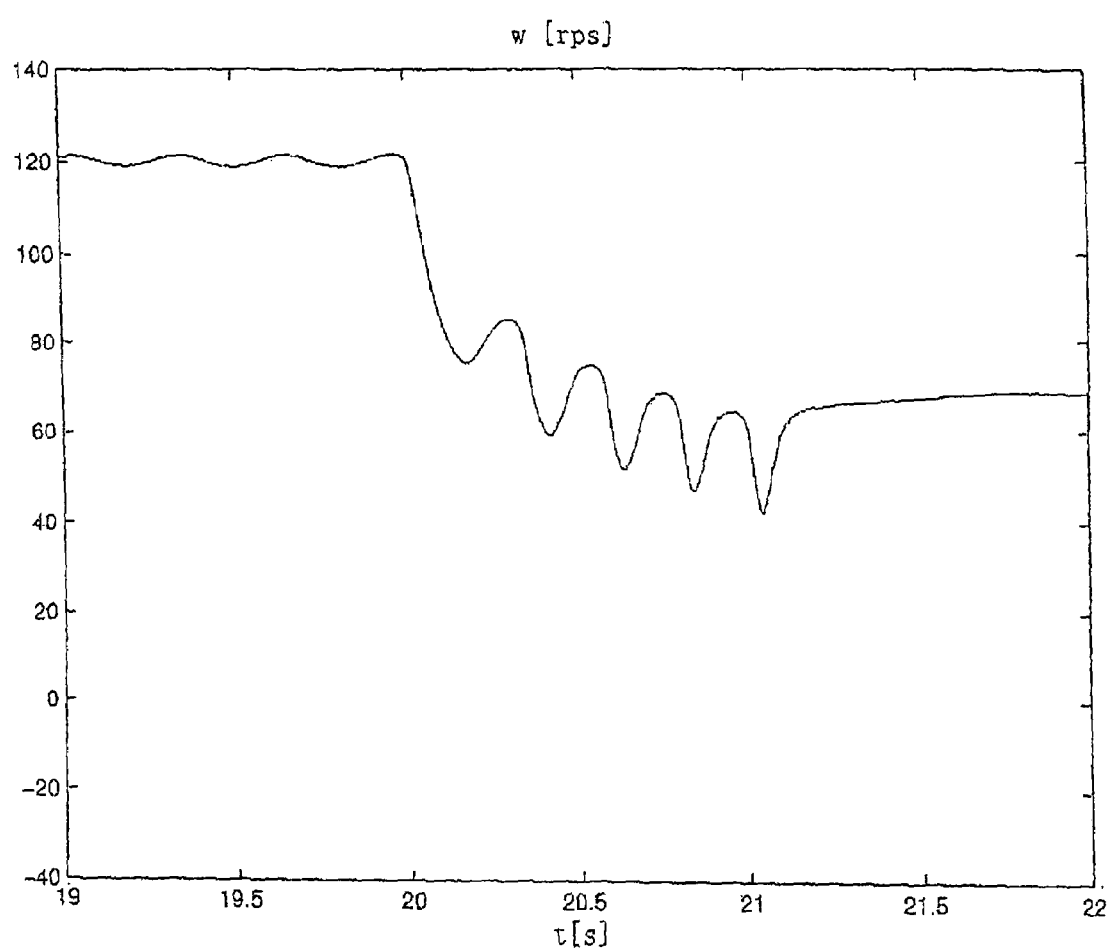
FIG. 19 is a diagram illustrating simulation result of change in passage of time of rotation speed obtained by the synchronous motor controlling apparatus of FIG. 17.
Figure 20:
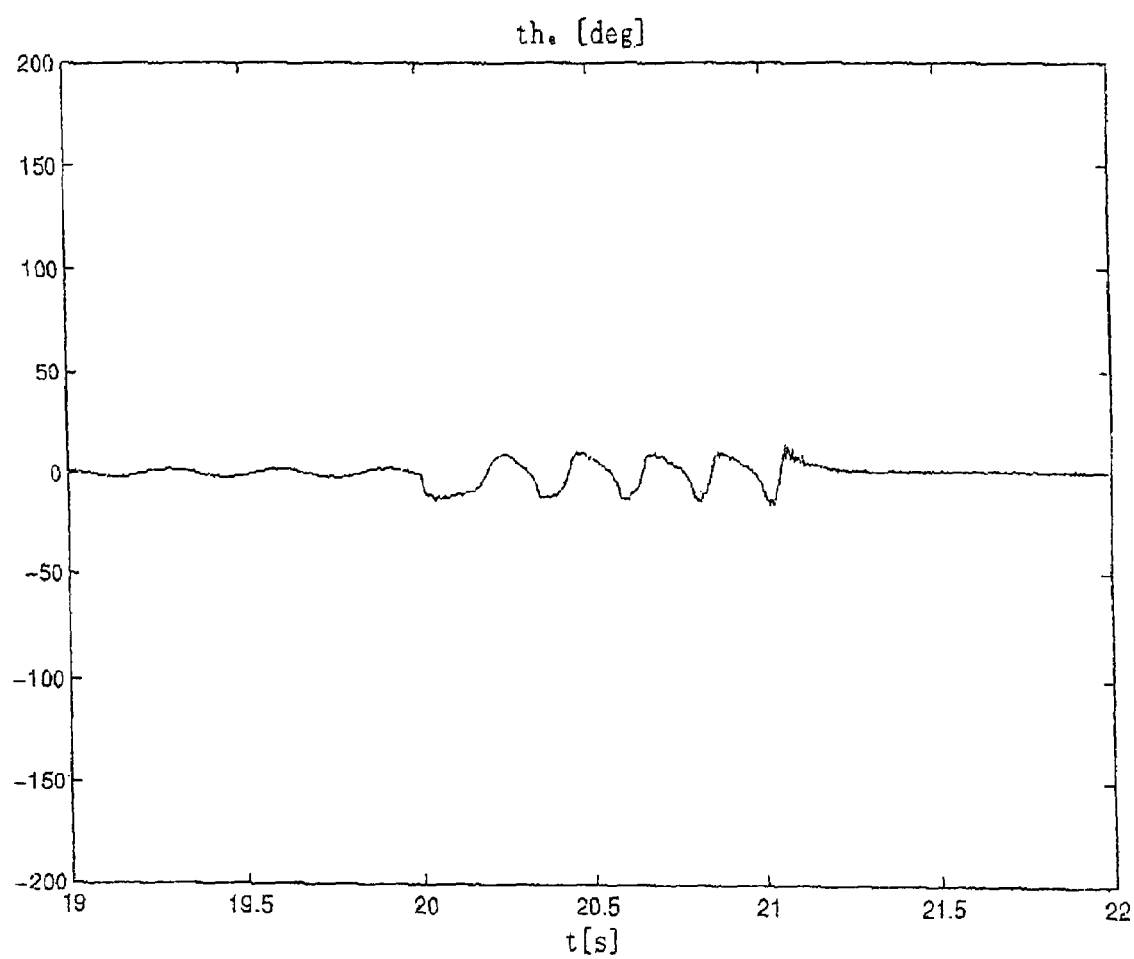
FIG. 20 is a diagram illustrating simulation result of change in passage of time of estimated angle error obtained by the synchronous motor controlling apparatus of FIG. 17.
Figure 21:
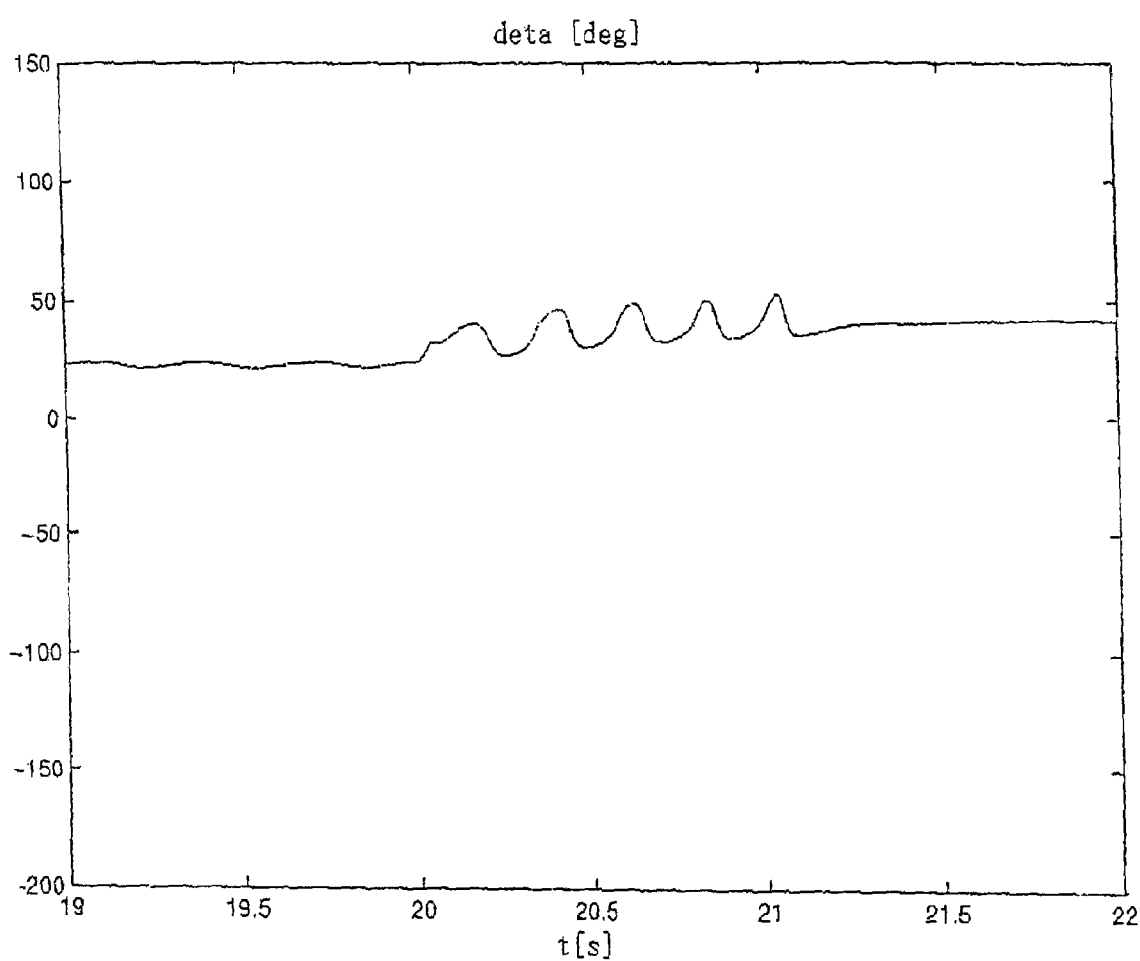
FIG. 21 is a diagram illustrating simulation result of change in passage of time of current phase obtained by the synchronous motor controlling apparatus of FIG. 17.
Figure 2:
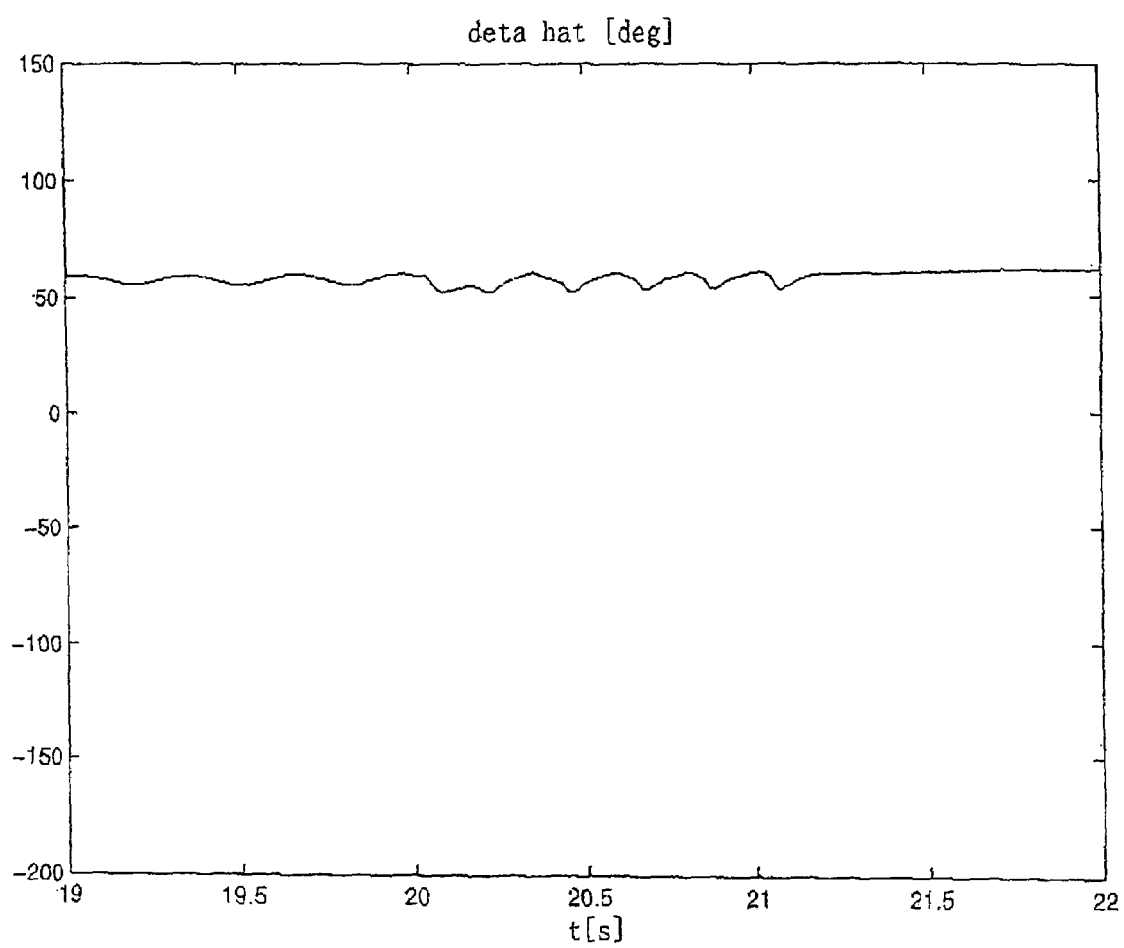
Figure 2:
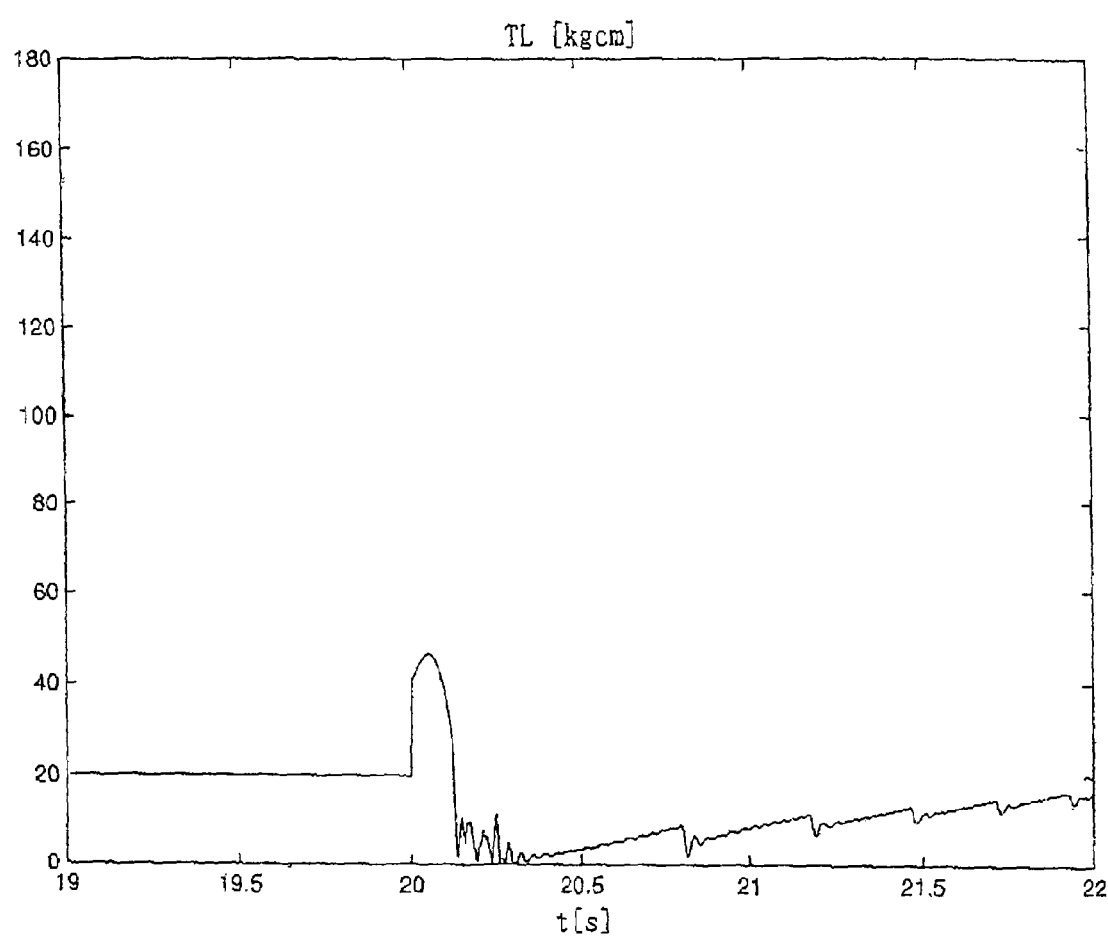
Figure 24:
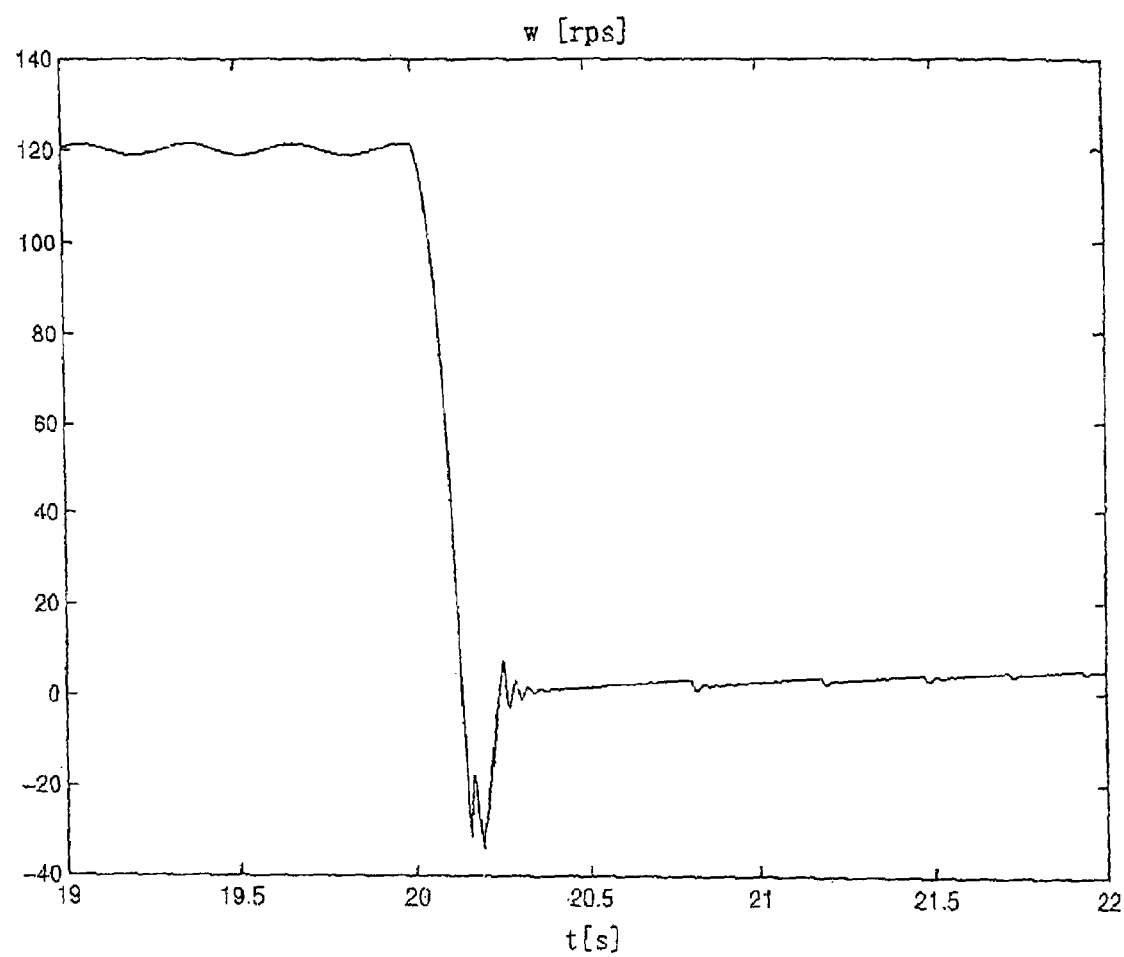
FIG. 24 is a diagram illustrating simulation result of change in passage of time of rotation speed obtained by the synchronous motor controlling apparatus which has no canceling means.
Figure 25:
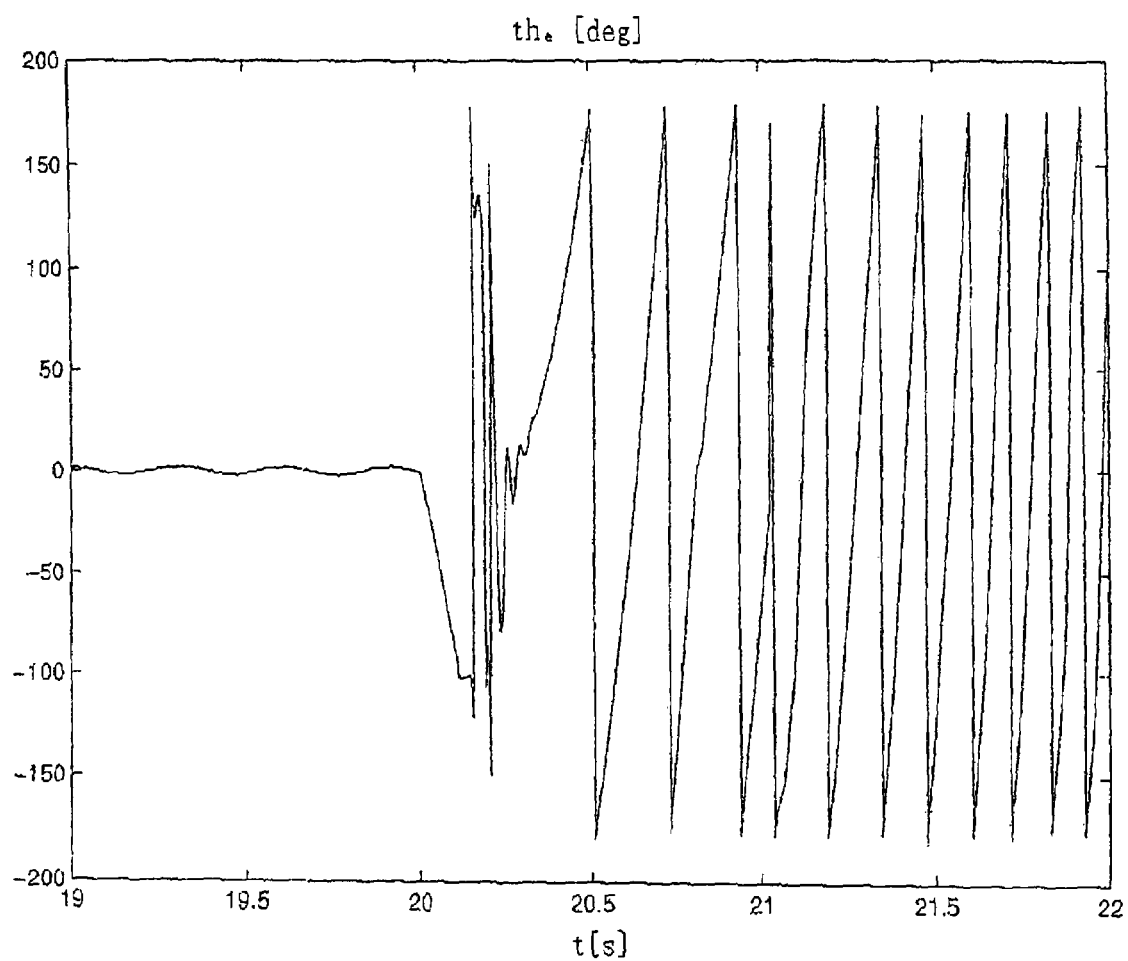
FIG. 25 is a diagram illustrating simulation result of change in passage of time of estimated angle error obtained by the synchronous motor controlling apparatus which has no canceling means.
Figure 2:
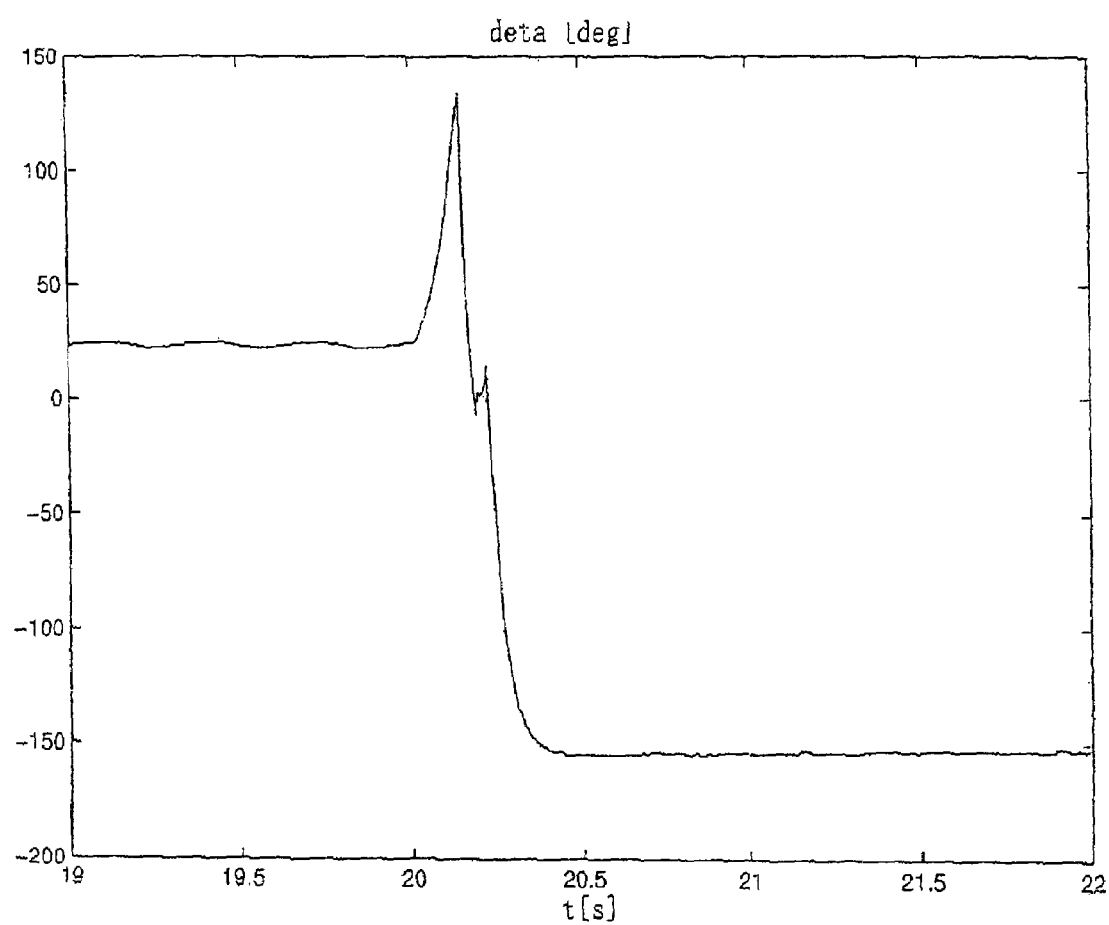
Figure 27:
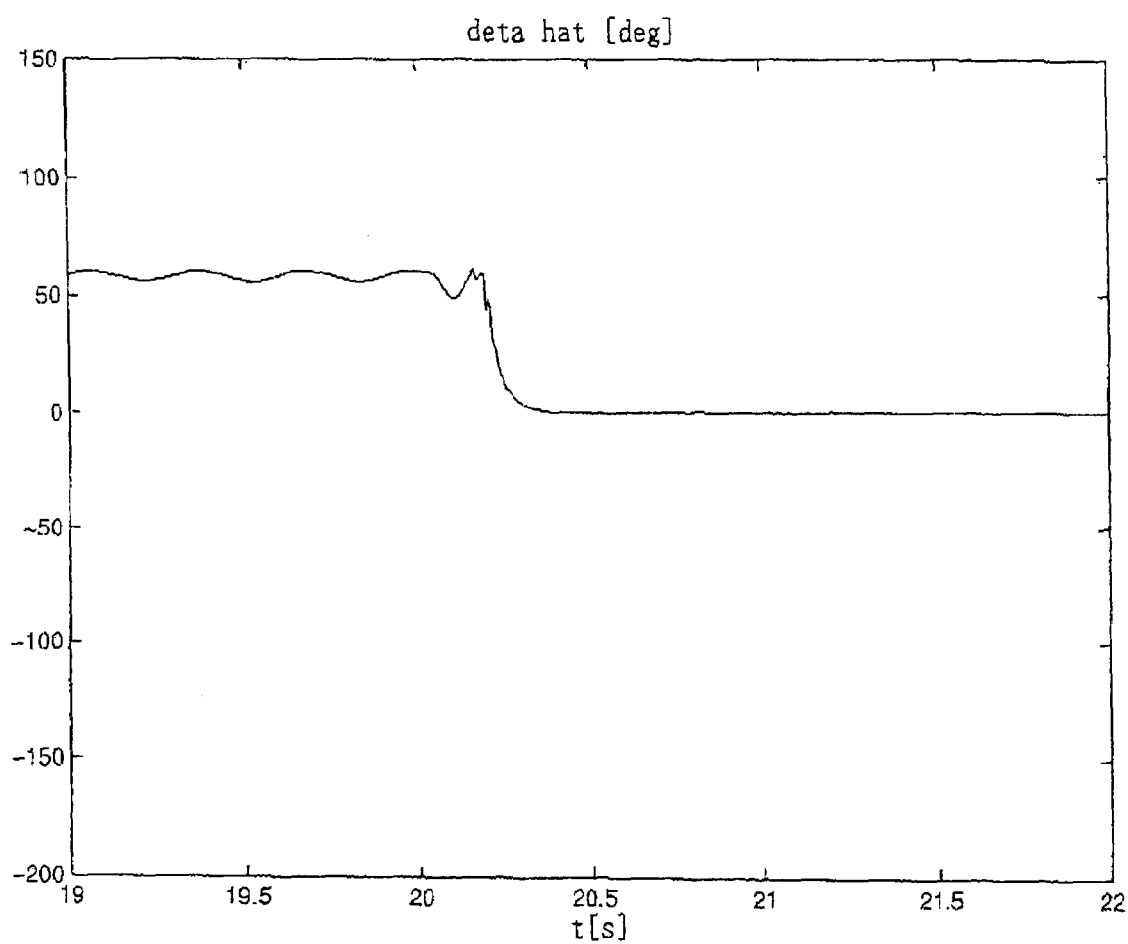
FIG. 27 is a diagram illustrating simulation result of change in passage of time of current phase estimation value within the controller obtained by the synchronous motor controlling apparatus which has no canceling means.

Next, simulation results by the synchronous motor controlling apparatus of FIG. 17 and simulation by the synchronous motor controlling apparatus without the canceling means are illustrated from FIG. 18 though FIG. 22, and from FIG. 23 to FIG. 27. FIGS. 18 and 23 illustrate the change of the load torque TL following passage of time, FIGS. 19 and 24 illustrate the change of the rotation speed W following passage of time, FIGS. 20 and 25 illustrate the change of the estimated angle error The following passage of time, FIGS. 21 and 26 illustrate the change of the current phase beta following passage of time, FIGS. 22 and 27 illustrate the change of the current phase estimation value betahat following passage of time, respectively.

When the synchronous motor controlling apparatus without the canceling means is employed, the change of the rotation speed is generated following the increase in load torque, so that great deviation is generated in estimated angle. Thus, the current phase is greatly shifted. Finally, the torque is not output so that the synchronous motor stalls and stops. On the contrary, when the synchronous motor controlling apparatus of FIG. 17 is employed, the change of the rotation speed is generated following the increase in load torque. But, the processing is carried out properly so that stalling and stopping of the synchronous motor is prevented from occurrence.

FIG. 17 illustrates the condition in which the noise filter 12 is separated from the position and speed detection section 6. Therefore, the arrangement of FIG. 17 cannot be employed when the noise filter is incorporated in the position and speed detection section in a separation impossible manner.

Figure 28:
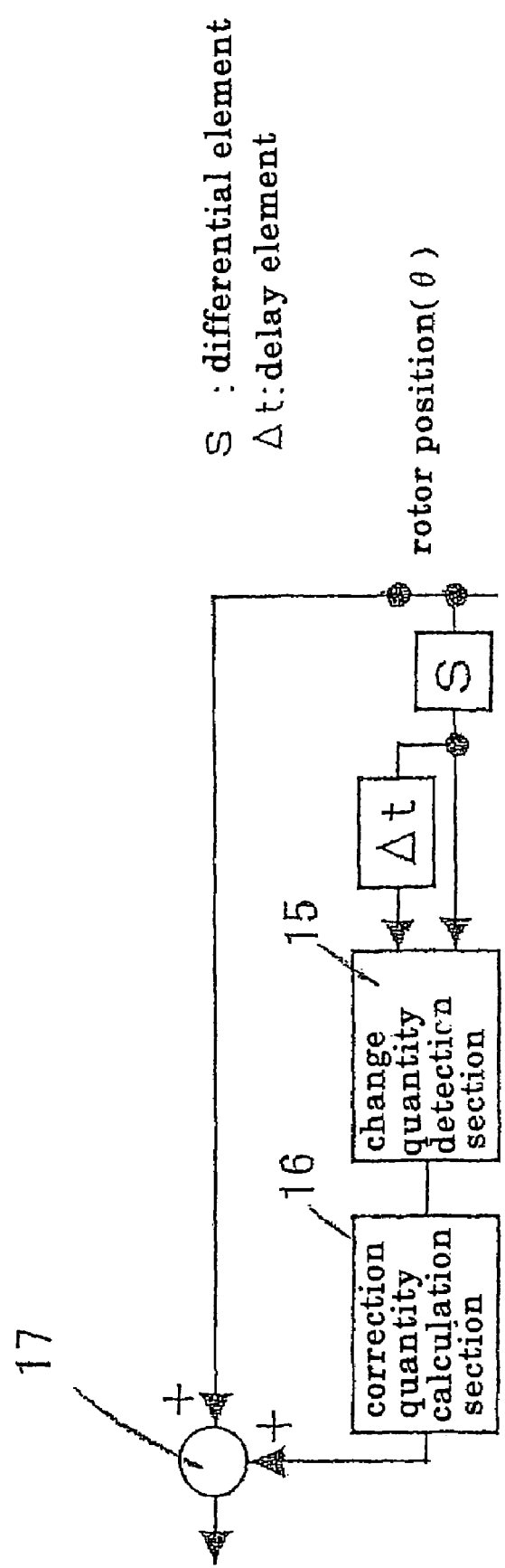
FIG. 28 is a block diagram illustrating an arrangement for compensating position shifting due to rapid variation in speed from the filtered position information.

In such case, shifting of the position due to the rapid speed change can be compensated by the following operation as is illustrated in FIG. 28: supplying the detected rotor position to the differential element s so as to detect the speed; supplying the speed to the delay element Δt so as to delay the speed; supplying the detected speed and the delayed speed to the change quantity detection section 15 so as to detect the change quantity of speed; supplying the change quantity to the correction quantity calculation section 16 so as to calculate the correction quantity for correcting the rotor position; and supplying the detected rotor position and the correction quantity to the addition section 17 so as to obtain the corrected rotor position.

The invention has the characteristic effect such that the speed variation of the synchronous motor is prevented from occurrence or is suppressed greatly even when the load has periodic torque variation, and that the method realizes improvement in controllability, improvement in voltage utilization rate, decrease in noise, sufficient suppression in vibration, and improvement in efficiency, with little affection of the motor characteristics.

The invention has the characteristic effect such that the speed variation of the synchronous motor is prevented from occurrence or is suppressed greatly by reducing the error even when the load has periodic torque variation, and that the method realizes improvement in controllability, improvement in voltage utilization rate, decrease in noise, sufficient suppression in vibration, and improvement in efficiency, with little affection of the motor characteristics.

The invention has the characteristic effect such that the rotational position of the rotor can be detected securely.

The invention has the characteristic effects such that the rotational position detection error is prevented from being generated.

This effect may apply to a motor having a great salient pole ratio.

The invention has the characteristic effects such that rotation speed variation can be suppressed securely.

The invention has the characteristic effects such that improvement in efficiency is realized in addition.

The invention has the characteristic effects such that the control can be simplified.

The invention has the characteristic effects such that the compressor for an air conditioner can be driven in a stable condition which has great load variation and is needed to be operated at high speed.

The invention has the characteristic effects such that either small delay case or great delay case can be dealt with so that the speed variation of the synchronous motor can be prevented from occurring or can be greatly suppressed, and that improvement in controllability, improvement in voltage utilization rate, decrease in noise, sufficient suppression in vibration, and improvement in efficiency are realized, with little effect on the motor characteristics.

The invention has the characteristic effects such that the high speed variation can be sufficiently followed, and that the speed variation of the synchronous motor can be prevented or greatly suppressed, and that improvement in controllability, improvement in voltage utilization rate, decrease in noise, sufficient suppression in vibration, and improvement in efficiency are realized, with little effect on the motor characteristics.

The invention has the characteristic effects such that the high speed variation can be sufficiently be followed, and that the speed variation of the synchronous motor can be prevented or greatly suppressed, and that improvement in controllability, improvement in voltage utilization rate, decrease in noise, sufficient suppression in vibration, and improvement in efficiency are realized, with little effect on the motor characteristics.

The invention has the characteristic effects such that the rotational position detection can be carried out without error for rapid load variation.

The invention has the characteristic effects such that the compressor for an air conditioner can be driven in a stable condition which has great load variation and is needed to be operated at high speed.

The invention has the characteristic effects such that the speed variation of the synchronous motor is prevented from occurrence or is suppressed greatly even when the load has periodic torque variation, and that the method realizes improvement in controllability, improvement in voltage utilization rate, decrease in noise, sufficient suppression in vibration, and improvement in efficiency, with little effect on the motor characteristics.

The invention has the characteristic effects such that the speed variation of the synchronous motor is prevented from occurrence or is suppressed greatly by reducing the error even when the load has periodic torque variation, and that the method realizes improvement in controllability, improvement in voltage utilization rate, decrease in noise, sufficient suppression in vibration, and improvement in efficiency, with little effect on the motor characteristics.

The invention has the characteristic effects such that the rotational position of the rotor can be detected securely.

The invention has the characteristic effects such that the rotational position detection error is prevented from being generated.

This method may be applied to a motor having a great salient pole ratio.

The invention has the characteristic effects such that rotation speed variation can be suppressed securely.

The invention has the characteristic effects such that improvement in efficiency is realized.

The invention has the characteristic effects such that the control can be simplified.

The invention has the characteristic effects such that the compressor for an air conditioner can be driven in a stable condition which has great load variation and is needed to be operated at high speed.

The invention has the characteristic effects such that either small delay case or great delay case can be dealt with so that the speed variation of the synchronous motor can be prevented from occurrence or can be greatly suppressed, and that improvement in controllability, improvement in voltage utilization rate, decrease in noise, sufficient suppression in vibration, and improvement in efficiency are realized, with little effect on the motor characteristics.

The invention has the characteristic effects such that the high speed variation can sufficiently be followed, and that the speed variation of the synchronous motor can be prevented or greatly suppressed, and that improvement in controllability, improvement in voltage utilization rate, decrease in noise, sufficient suppression in vibration, and improvement in efficiency are realized, with little effect on the motor characteristics.

The invention has the characteristic effects such that the high speed variation can sufficiently be followed, and that the speed variation of the synchronous motor can be prevented or greatly suppressed, and that improvement in controllability, improvement in voltage utilization rate, decrease in noise, sufficient suppression in vibration, and improvement in efficiency are realized, with little effect on the motor characteristics.

The invention has the characteristic effects such that the rotational position detection can be carried out without error for rapid load variation.

The invention has the characteristic effects such that the compressor for an air conditioner can be driven in a stable condition which has great load variation and is needed to be operated at high speed.

INDUSTRIAL UTILIZATION

The invention can be applied to various field employing a synchronous motor as driving source so that improvement in controllability, improvement in voltage utilization rate, decrease in noise, sufficient suppression in vibration, and improvement in efficiency are realized, with little affection of the motor characteristics.

What is claimed is:

1. A method for controlling synchronous motor, comprising:
   detecting a rotational position of a rotor based on input terminal voltages and currents supplied to a synchronous motor driving a load having periodic torque variation;
   controlling output currents or output voltages from an inverter based on a result of the rotational position detection step so that a speed variation of the synchronous motor due to the periodic torque variation is minimized;
   supplying the output voltages and output currents from the inverter as the input terminal voltages and the currents of the synchronous motor;
   obtaining a rotational position correction value based on a result of the step of detecting the rotational position of the rotor; and
   canceling a delay, wherein the delay is a delay in receiving the rotational position detection result or a delay due to a response speed in carrying out the step of detecting the rotational position of the rotor.

2. A method for controlling synchronous motor as set forth in claim 1, wherein the controlling step controls the synchronous motor within a range of current phase which satisfies an equation $(L_d-L_q)i_d+\emptyset>0$, wherein $L_d$ represents d-axis inductance, $L_q$ represents q-axis inductance, $i_d$ represents d-axis current, and $\emptyset$ represents rotor flux linkage.

3. A method for controlling synchronous motor as set forth in claim 1 or claim 2, wherein in the detecting step, a rotating coordinate motor model is used to detect the rotational position of the rotor.

4. A method for controlling synchronous motor as set forth in claim 3, wherein the synchronous motor is a motor which a salient pole ratio, defined as $|L_d-L_q|$ is minimized.

5. A method for controlling synchronous motor as set forth in claim 1 or claim 2, wherein in the detecting step, a fixed coordinate motor model is used to detect the rotational position of the rotor.

6. A method for controlling synchronous motor as set forth in claim 5, wherein the synchronous motor is a motor which a salient pole ratio, defined as $|L_d-L_q|$, is minimized.

7. A method for controlling synchronous motor as set forth in claim 1, further comprising:
   controlling torque by determining a feedback gain for frequency component of rotational speed variation to be infinite.

8. A method for controlling synchronous motor as set forth in claim 1, further comprising:
   storing previous current or voltage pattern according to a load variation; and
   outputting corresponding current or voltage pattern based on the result of the rotational position detection step so that the speed variation due to the load variation is reduced.

9. A method for controlling synchronous motor as set forth in claim 1, further comprising:
   controlling torque by adjusting current phase and current amplitude of the output currents from the inverter.

10. A method for controlling synchronous motor as set forth in claim 1, further comprising:
controlling torque by maintaining a current phase to be constant and by varying a current amplitude of the output currents from the inverter.

11. A method for controlling synchronous motor as set forth in claim 1, wherein the synchronous motor is part of a compressor for an air conditioner.

12. A method for controlling synchronous motor, comprising:
detecting a rotational position of a rotor based on higher harmonics of input terminal voltages and currents supplied to a synchronous motor driving a load having periodic torque variation and inductance distribution of the synchronous motor;
controlling output currents or output voltages from an inverter based on a result of the rotational position detection step so that a speed variation of the synchronous motor due to the periodic torque variation is minimized;
supplying the output voltages and output currents from the inverter as the input terminal voltages and the currents of the synchronous motor;
obtaining a rotational position correction value based on a result of the step of detecting the rotational position of the rotor; and
canceling a delay, wherein the delay is a delay in receiving the rotational position detection result or a delay due to a response speed in carrying out the step of detecting the rotational position of the rotor.

13. A method for controlling synchronous motor under a condition where a speed command value, a torque command or a load changes from moment to moment, the method comprising:
detecting a rotational position of a rotor based on input terminal voltages and currents of a synchronous motor driving a load having periodic torque variation;
obtaining a rotational position correction value using a filter based on a result of the rotational position detection step;
canceling a delay, wherein the delay is a delay of the filter in receiving the rotational position detection result as the input or a delay due to a response speed in carrying out the rotational position detection step;
controlling output currents or output voltages from an inverter based upon the rotational position correction value or the delay value; and
supplying the output voltages and output currents from the inverter as the input terminal voltages and the currents of the synchronous motor.

14. A method for controlling synchronous motor as set forth in claim 13, wherein in the detecting step, a fixed coordinate motor model is used to detect the rotational position of the rotor, the method further comprising:
calculating flux by integrating the input terminal voltage of the synchronous motor; and
calculating the rotational position of the rotor based on the rotational position information of the rotor included within the flux.

15. A method for controlling synchronous motor as set forth in claim 13, wherein a motor having magnetic salient pole is employed as the synchronous motor, the method further comprising calculating a rotational position using higher harmonics of input terminal voltages and higher harmonics of input terminal currents to the synchronous motor.

16. A method for controlling synchronous motor as set forth in claim 13, wherein the synchronous motor is part of a compressor for an air conditioner.

17. A method for controlling synchronous motor under a condition where a speed command value, a torque command or a load changes from moment to moment, comprising:
calculating a rotational position of a rotor using input terminal voltages and currents supplied to a synchronous motor;
controlling output currents or output voltages from an inverter based on a result of the rotational position calculation step;
supplying the output voltages and output currents from the inverter as the input terminal voltages and the currents of the synchronous motor;
obtaining a rotational position correction value based on a result of the step of detecting the rotational position of the rotor; and
canceling a delay, wherein the delay is a delay in receiving the rotational position detection result or a delay due to a response speed in carrying out the step of detecting the rotational position of the rotor.

18. A method for controlling synchronous motor as set forth in claim 17, wherein in the detecting step, a fixed coordinate motor model is used to detect the rotational position of the rotor, the method further comprising:
calculating flux by integrating the input terminal voltage of the synchronous motor; and
calculating the rotational position of the rotor based on the rotational position information of the rotor included within the flux.

19. An apparatus for controlling synchronous motor comprising:
rotational position detection means configured for detecting a rotational position of a rotor using input terminal voltages and currents supplied to a synchronous motor driving a load having periodic torque variation;
inverter controlling means configured for controlling output currents or output voltages from an inverter based on the rotational position detected by the rotational position detection means so that speed variation of the synchronous motor due to the periodic torque variation is minimized;
a filter configured for obtaining a rotational position correction value based on the rotational position of the rotor detected by the rotational position detection means; and
a delay canceling device configured for canceling a delay, wherein the delay is a delay of the filter in receiving the rotational position of the rotor or a delay due to a response speed of the rotational position detection means,
wherein the output voltages and output currents from the inverter serve as the input terminal voltages and currents of the synchronous motor.

20. An apparatus for controlling synchronous motor as set forth in claim 19, wherein the inverter controlling means is configured to control the synchronous motor within a range of current phase which satisfies an equation $(L_d-L_q)i_d+\emptyset>0$, wherein $L_d$ represents d-axis inductance, $L_q$ represents q-axis inductance, $i_d$ represents d-axis current, and $\emptyset$ represents rotor flux linkage.

21. An apparatus for controlling synchronous motor as set forth in claim 19 or claim 20, wherein the rotational position detection means is configured to detect the rotational position using a rotating coordinate motor model.

22. An apparatus for controlling synchronous motor as set forth in claim 21, wherein the synchronous motor is a motor which a salient pole ratio, defined as $|L_d-L_q|$, is minimized.

23. An apparatus for controlling synchronous motor as set forth in claim 19 or claim 20, wherein the rotational position detection means is configured to detect the rotational position using a fixed coordinate motor model.

24. An apparatus for controlling synchronous motor as set forth in claim 23, wherein the synchronous motor is a motor in which a value of $|L_d-L_q|$ is maximized.

25. An apparatus for controlling synchronous motor as set forth in claim 19, wherein the inverter controlling is configured to carry out a torque controlling by determining a feedback gain for a frequency component of rotational speed variation to be infinite.

26. An apparatus for controlling synchronous motor as set forth in claim 19, wherein the inverter controlling means is configured to store previous current or voltage pattern according to a load variation, and configured to output corresponding current or voltage pattern according to the rotational position detected by the rotational position detection means so that speed variation due to the load variation is reduced.

27. An apparatus for controlling synchronous motor as set forth in claim 19, wherein the inverter controlling means is configured to carry out a torque controlling by making adjusting current phase and the current amplitude of the output currents from the inverter.

28. An apparatus for controlling synchronous motor as set forth in claim 19, wherein the inverter controlling means is configured to carry out a torque controlling by maintaining a current phase to be constant and by varying a current amplitude of the output currents from the inverter.

29. An apparatus for controlling synchronous motor as set forth in claim 19, wherein the synchronous motor is part of a compressor for an air conditioner.

30. An apparatus for controlling synchronous motor comprising:
   rotational position detection means configured for detecting a rotational position of a rotor based on higher harmonics of input terminal voltages and currents supplied to a synchronous motor driving a load having periodic torque variation and inductance distribution of the synchronous motor;
   inverter controlling means configured for controlling output currents or output voltages of an inverter based on the rotational position detected by the rotational position detection means so that speed variation of the synchronous motor due to the periodic torque variation is minimized;
   a filter configured for obtaining a rotational position correction value based on the rotational position of the rotor detected by the rotational position detection means; and
   a delay canceling device configured for canceling a delay, wherein the delay is a delay of the filter in receiving the rotational position of the rotor or a delay due to a response speed of the rotational position detection means,
   wherein the output voltages and output currents from the inverter serve as the input terminal voltages and currents of the synchronous motor.

31. An apparatus for controlling synchronous motor is under a condition where a speed command value, a torque command or a load changes from moment to moment, the apparatus comprising:
   rotational position detection means configured for detecting a rotational position of a rotor based on input terminal voltages and currents of a synchronous motor driving a load having periodic torque variation;
   filter means configured for obtaining a rotational position correction value based on the rotational position detected by the rotational position detection means;
   canceling means configured for canceling a delay, wherein the delay is due to a delay of the filter means in receiving the rotational position from the rotational position detection means as the input or a delay due to a response speed of the rotational position detection means; and
   inverter controlling means configured for controlling output currents or output voltages of an inverter based on the rotational position correction value or the delay value
   wherein the output voltages and output currents from the inverter serve as the input terminal voltages and currents of the synchronous motor.

32. An apparatus for controlling synchronous motor as set forth in claim 31, wherein the synchronous motor is a motor having magnetic salient pole, and the rotational position calculation means is configured to calculate a rotational position using higher harmonics of input voltages and higher harmonics of currents to the synchronous motor.

33. An apparatus for controlling synchronous motor as set forth in claim 31, wherein the synchronous motor is part of a compressor for an air conditioner.

34. An apparatus for controlling synchronous motor under a condition where a speed command value, a torque command or a load changes from moment to moment, the apparatus comprising:
   rotational position calculation means configured for calculating a rotational position of a rotor based on input terminal voltages and currents of a synchronous motor; and
   inverter controlling means configured for controlling output currents or output voltages of an inverter based on the rotational position calculated by the rotational position calculation means,
   wherein the output voltages and output currents from the inverter serve as the input terminal voltages and currents of the synchronous motor, and
   wherein the synchronous motor is a motor having magnetic salient pole, and the rotational position calculation means is configured to calculate a rotational position using higher harmonics of input voltages and higher harmonics of currents to the synchronous motor.

35. An apparatus for controlling synchronous motor as set forth in claim 34, wherein the rotational position calculation means is configured to use fixed coordinate motor model, and is further configured to calculate flux by integrating the motor voltage, and calculate the rotational position from the rotational position information of the rotor included within the flux.

36. An apparatus for controlling synchronous motor as set forth in claim 34, further comprising:
   a filter configured for obtaining a rotational position correction value based on the rotational position of the rotor detected by the rotational position detection means; and
   a delay canceling device configured for canceling a delay, wherein the delay is a delay of the filter in receiving the rotational position of the rotor or a delay due to a response speed of the rotational position detection means.

* * * * *